US008537374B2

(12) United States Patent
Briggs et al.

(10) Patent No.: US 8,537,374 B2
(45) Date of Patent: Sep. 17, 2013

(54) COORDINATE MEASURING MACHINE HAVING AN ILLUMINATED PROBE END AND METHOD OF OPERATION

(71) Applicants: Clark H. Briggs, DeLand, FL (US); David Danielson, Sorrento, FL (US)

(72) Inventors: Clark H. Briggs, DeLand, FL (US); David Danielson, Sorrento, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 13/632,253

(22) Filed: Oct. 1, 2012

(65) Prior Publication Data

US 2013/0025144 A1    Jan. 31, 2013

Related U.S. Application Data

(63) Continuation of application No. 13/006,471, filed on Jan. 14, 2011, now Pat. No. 8,284,407.

(60) Provisional application No. 61/296,555, filed on Jan. 20, 2010, provisional application No. 61/362,497, filed on Jul. 8, 2010.

(51) Int. Cl.
*G01B 11/14* (2006.01)

(52) U.S. Cl.
USPC .......................................... 356/614; 356/622

(58) Field of Classification Search
USPC .................. 356/614–615, 619–623, 12, 3, 9, 356/11, 138–139, 139.03–139.08, 139.1, 356/141.1–141.5; 702/95, 152, 85, 94, 150, 702/127; 33/501, 503, 502, 504, 505, 127; 382/100, 154, 151, 152, 153, 107, 106; 345/419, 418; 700/161, 245, 90, 96, 117, 700/159, 160

See application file for complete search history.

(56) References Cited

U.S. PATENT DOCUMENTS

| 1,535,312 A | 4/1925 | Hosking |
| 1,918,813 A | 7/1933 | Kinzy |
| 2,316,573 A | 4/1943 | Egy |
| 2,333,243 A | 11/1943 | Glab |

(Continued)

FOREIGN PATENT DOCUMENTS

| CN | 2236119 | 9/1996 |
| CN | 2508896 | 9/2002 |

(Continued)

OTHER PUBLICATIONS

Examination Report under Section 18(3); Report dated Nov. 1, 2012; Application No. GB1210311.5.

(Continued)

*Primary Examiner* — Tri T Ton
(74) *Attorney, Agent, or Firm* — Cantor Colburn LLP

(57) ABSTRACT

A portable articulated arm coordinate measuring machine (AACMM) is provided. The AACMM includes a manually positionable articulated arm having opposed first and second ends. The arm includes a plurality of connected arm segments, each of the arm segments including at least one position transducer for producing a position signal. A measurement device is attached to a first end of the AACMM. An electronic circuit is provided for receiving the position signals from the transducers and for providing data corresponding to a position of the measurement device. A light source is coupled to the arm and disposed to emit light adjacent the measurement device.

24 Claims, 17 Drawing Sheets

(56) References Cited

U.S. PATENT DOCUMENTS

| | | |
|---|---|---|
| 2,702,683 A | 2/1955 | Green et al. |
| 2,748,926 A | 6/1956 | Leahy |
| 2,924,495 A | 2/1960 | Haines |
| 2,966,257 A | 12/1960 | Littlejohn |
| 2,983,367 A | 5/1961 | Paramater et al. |
| 3,066,790 A | 12/1962 | Armbruster |
| 3,458,167 A | 7/1969 | Cooley, Jr. |
| 4,138,045 A | 2/1979 | Baker |
| 4,340,008 A | 7/1982 | Mendelson |
| 4,379,461 A | 4/1983 | Nilsson et al. |
| 4,424,899 A | 1/1984 | Rosenberg |
| 4,430,796 A | 2/1984 | Nakagawa |
| 4,457,625 A | 7/1984 | Greenleaf et al. |
| 4,506,448 A | 3/1985 | Topping et al. |
| 4,537,233 A | 8/1985 | Vroonland et al. |
| 4,606,696 A | 8/1986 | Slocum |
| 4,659,280 A | 4/1987 | Akeel |
| 4,663,852 A | 5/1987 | Guarini |
| 4,664,588 A | 5/1987 | Newell et al. |
| 4,676,002 A | 6/1987 | Slocum |
| 4,714,339 A | 12/1987 | Lau et al. |
| 4,751,950 A | 6/1988 | Bock |
| 4,790,651 A | 12/1988 | Brown et al. |
| 4,816,822 A | 3/1989 | Vache et al. |
| 4,882,806 A | 11/1989 | Davis |
| 4,954,952 A | 9/1990 | Ubhayakar et al. |
| 4,982,841 A | 1/1991 | Goedecke |
| 4,996,909 A | 3/1991 | Vache et al. |
| 5,025,966 A | 6/1991 | Potter |
| 5,027,951 A | 7/1991 | Johnson |
| 5,189,797 A | 3/1993 | Granger |
| 5,205,111 A | 4/1993 | Johnson |
| 5,211,476 A | 5/1993 | Coudroy |
| 5,213,240 A | 5/1993 | Dietz et al. |
| 5,219,423 A | 6/1993 | Kamaya |
| 5,239,855 A | 8/1993 | Schleifer et al. |
| 5,289,264 A | 2/1994 | Steinbichler |
| 5,319,445 A | 6/1994 | Fitts |
| 5,332,315 A | 7/1994 | Baker et al. |
| 5,372,250 A | 12/1994 | Johnson |
| 5,373,346 A | 12/1994 | Hocker |
| 5,402,582 A | 4/1995 | Raab |
| 5,412,880 A | 5/1995 | Raab |
| 5,430,384 A | 7/1995 | Hocker |
| 5,455,670 A | 10/1995 | Payne et al. |
| 5,455,993 A | 10/1995 | Link et al. |
| 5,510,977 A | 4/1996 | Raab |
| 5,528,505 A | 6/1996 | Granger et al. |
| 5,535,524 A | 7/1996 | Carrier et al. |
| 5,611,147 A | 3/1997 | Raab |
| 5,623,416 A | 4/1997 | Hocker, III |
| 5,682,508 A | 10/1997 | Hocker, III |
| 5,724,264 A | 3/1998 | Rosenberg et al. |
| 5,752,112 A | 5/1998 | Paddock et al. |
| 5,754,449 A | 5/1998 | Hoshal et al. |
| 5,768,792 A | 6/1998 | Raab |
| 5,829,148 A | 11/1998 | Eaton |
| 5,832,416 A | 11/1998 | Anderson |
| 5,887,122 A | 3/1999 | Terawaki et al. |
| 5,926,782 A | 7/1999 | Raab |
| 5,956,857 A | 9/1999 | Raab |
| 5,973,788 A | 10/1999 | Pettersen et al. |
| 5,978,748 A | 11/1999 | Raab |
| 5,983,936 A | 11/1999 | Schwieterman et al. |
| 5,996,790 A | 12/1999 | Yamada et al. |
| 5,997,779 A | 12/1999 | Potter |
| D423,534 S | 4/2000 | Raab et al. |
| 6,050,615 A | 4/2000 | Weinhold |
| 6,060,889 A | 5/2000 | Hocker |
| 6,067,116 A | 5/2000 | Yamano et al. |
| 6,125,337 A | 9/2000 | Rosenberg et al. |
| 6,131,299 A | 10/2000 | Raab et al. |
| 6,151,789 A | 11/2000 | Raab et al. |
| 6,163,294 A | 12/2000 | Talbot |
| 6,166,504 A | 12/2000 | Iida et al. |
| 6,166,809 A | 12/2000 | Pettersen et al. |
| 6,166,811 A | 12/2000 | Long et al. |
| 6,219,928 B1 | 4/2001 | Raab et al. |
| D441,632 S | 5/2001 | Raab et al. |
| 6,240,651 B1 | 6/2001 | Schroeder et al. |
| 6,253,458 B1 | 7/2001 | Raab et al. |
| 6,282,195 B1 | 8/2001 | Miller et al. |
| 6,298,569 B1 | 10/2001 | Raab et al. |
| 6,366,831 B1 | 4/2002 | Raab |
| 6,418,774 B1 | 7/2002 | Brogaardh et al. |
| 6,438,856 B1 | 8/2002 | Kaczynski |
| 6,442,419 B1 | 8/2002 | Chu et al. |
| 6,470,584 B1 | 10/2002 | Stoodley |
| 6,477,784 B2 | 11/2002 | Schroeder et al. |
| 6,519,860 B1 | 2/2003 | Bieg et al. |
| D472,824 S | 4/2003 | Raab et al. |
| 6,547,397 B1 | 4/2003 | Kaufman et al. |
| 6,598,306 B2 | 7/2003 | Eaton |
| 6,611,346 B2 | 8/2003 | Granger |
| 6,611,617 B1 | 8/2003 | Crampton |
| 6,612,044 B2 | 9/2003 | Raab et al. |
| 6,621,065 B1 | 9/2003 | Fukumoto et al. |
| 6,626,339 B2 | 9/2003 | Gates et al. |
| 6,633,051 B1 | 10/2003 | Holloway et al. |
| 6,668,466 B1 | 12/2003 | Bieg et al. |
| D491,210 S | 6/2004 | Raab et al. |
| 6,764,185 B1 | 7/2004 | Beardsley et al. |
| 6,789,327 B2 | 9/2004 | Roth et al. |
| 6,820,346 B2 | 11/2004 | Raab et al. |
| 6,822,749 B1 | 11/2004 | Christoph |
| 6,826,664 B2 | 11/2004 | Hocker, III et al. |
| 6,868,359 B2 | 3/2005 | Raab |
| 6,879,933 B2 | 4/2005 | Steffey et al. |
| 6,892,465 B2 | 5/2005 | Raab et al. |
| 6,895,347 B2 | 5/2005 | Dorny et al. |
| 6,901,673 B1 | 6/2005 | Cobb et al. |
| 6,904,691 B2 | 6/2005 | Raab et al. |
| 6,920,697 B2 | 7/2005 | Raab et al. |
| 6,925,722 B2 | 8/2005 | Raab et al. |
| 6,931,745 B2 | 8/2005 | Granger |
| 6,935,748 B2 | 8/2005 | Kaufman et al. |
| 6,948,255 B2 | 9/2005 | Russell |
| 6,965,843 B2 | 11/2005 | Raab et al. |
| 7,003,892 B2 | 2/2006 | Eaton et al. |
| 7,006,084 B1 | 2/2006 | Buss et al. |
| 7,024,032 B2 | 4/2006 | Kidd et al. |
| 7,032,321 B2 | 4/2006 | Raab et al. |
| 7,040,136 B2 | 5/2006 | Forss et al. |
| 7,051,447 B2 | 5/2006 | Kikuchi et al. |
| 7,106,421 B2 | 9/2006 | Matsuura et al. |
| 7,117,107 B2 | 10/2006 | Dorny et al. |
| 7,120,092 B2 | 10/2006 | del Prado Pavon et al. |
| 7,152,456 B2 | 12/2006 | Eaton |
| 7,174,651 B2 | 2/2007 | Raab et al. |
| 7,184,047 B1 | 2/2007 | Crampton |
| 7,191,541 B1 | 3/2007 | Weekers et al. |
| 7,193,690 B2 | 3/2007 | Ossig et al. |
| 7,196,509 B2 | 3/2007 | Teng |
| 7,199,872 B2 | 4/2007 | Van Cranenbroeck |
| 7,230,689 B2 | 6/2007 | Lau |
| 7,242,590 B1 | 7/2007 | Yeap et al. |
| 7,249,421 B2 | 7/2007 | MacManus et al. |
| 7,269,910 B2 | 9/2007 | Raab et al. |
| 7,285,793 B2 | 10/2007 | Husted |
| 7,296,979 B2 | 11/2007 | Raab et al. |
| 7,306,339 B2 | 12/2007 | Kaufman et al. |
| 7,312,862 B2 | 12/2007 | Zumbrunn et al. |
| 7,313,264 B2 | 12/2007 | Crampton |
| 7,319,512 B2 | 1/2008 | Ohtomo et al. |
| 7,337,344 B2 | 2/2008 | Barman et al. |
| 7,348,822 B2 | 3/2008 | Baer |
| 7,352,446 B2 | 4/2008 | Bridges et al. |
| 7,360,648 B1 | 4/2008 | Blaschke |
| 7,372,558 B2 | 5/2008 | Kaufman et al. |
| 7,372,581 B2 * | 5/2008 | Raab et al. .................. 356/614 |
| 7,383,638 B2 | 6/2008 | Granger |
| 7,388,654 B2 | 6/2008 | Raab et al. |
| 7,389,870 B2 | 6/2008 | Slappay |
| 7,395,606 B2 | 7/2008 | Crampton |

| | | |
|---|---|---|
| 7,430,068 B2 | 9/2008 | Becker et al. |
| 7,447,931 B1 | 11/2008 | Rischar et al. |
| 7,449,876 B2 | 11/2008 | Pleasant et al. |
| 7,454,265 B2 | 11/2008 | Marsh |
| 7,463,368 B2 | 12/2008 | Morden et al. |
| 7,480,037 B2 | 1/2009 | Palmateer et al. |
| 7,508,971 B2 | 3/2009 | Vaccaro et al. |
| 7,525,276 B2 | 4/2009 | Eaton |
| 7,545,517 B2 | 6/2009 | Rueb et al. |
| 7,546,689 B2 | 6/2009 | Ferrari et al. |
| 7,552,644 B2 | 6/2009 | Haase et al. |
| 7,561,598 B2 | 7/2009 | Stratton et al. |
| 7,564,250 B2 | 7/2009 | Hocker |
| 7,578,069 B2 | 8/2009 | Eaton |
| D599,226 S | 9/2009 | Gerent et al. |
| 7,589,595 B2 | 9/2009 | Cutler |
| 7,591,077 B2 | 9/2009 | Pettersson |
| 7,591,078 B2 | 9/2009 | Crampton |
| 7,602,873 B2 | 10/2009 | Eidson |
| 7,604,207 B2 | 10/2009 | Hasloecher et al. |
| 7,610,175 B2 | 10/2009 | Eidson |
| 7,614,157 B2 | 11/2009 | Granger |
| 7,624,510 B2 | 12/2009 | Ferrari |
| D607,350 S | 1/2010 | Cooduvalli et al. |
| 7,656,751 B2 | 2/2010 | Rischar et al. |
| 7,693,325 B2 | 4/2010 | Pulla et al. |
| 7,701,592 B2 | 4/2010 | Saint Clair et al. |
| 7,712,224 B2 | 5/2010 | Hicks |
| 7,721,396 B2 | 5/2010 | Fleischman |
| 7,735,234 B2 | 6/2010 | Briggs et al. |
| 7,743,524 B2 | 6/2010 | Eaton et al. |
| 7,752,003 B2 | 7/2010 | MacManus |
| 7,765,707 B2 | 8/2010 | Tomelleri |
| 7,769,559 B2 | 8/2010 | Reichert |
| 7,774,949 B2 | 8/2010 | Ferrari |
| 7,779,548 B2 | 8/2010 | Ferrari |
| 7,779,553 B2 | 8/2010 | Jordil et al. |
| 7,800,758 B1 | 9/2010 | Bridges et al. |
| 7,804,602 B2 | 9/2010 | Raab |
| 7,805,851 B2 | 10/2010 | Pettersson |
| 7,805,854 B2 | 10/2010 | Eaton |
| 7,809,518 B2 | 10/2010 | Zhu et al. |
| RE42,055 E | 1/2011 | Raab et al. |
| RE42,082 E | 2/2011 | Raab et al. |
| 7,881,896 B2 | 2/2011 | Atwell et al. |
| 7,903,261 B2 | 3/2011 | Saint Clair et al. |
| 7,908,757 B2 | 3/2011 | Ferrari |
| 8,052,857 B2 | 11/2011 | Townsend |
| 8,065,861 B2 | 11/2011 | Caputo |
| 8,082,673 B2 | 12/2011 | Desforges et al. |
| 8,099,877 B2 | 1/2012 | Champ |
| 8,123,350 B2 | 2/2012 | Cannell et al. |
| 2001/0004269 A1 | 6/2001 | Shibata et al. |
| 2002/0032541 A1 | 3/2002 | Raab et al. |
| 2002/0087233 A1 | 7/2002 | Raab |
| 2002/0128790 A1 | 9/2002 | Woodmansee |
| 2002/0170192 A1 | 11/2002 | Steffey et al. |
| 2003/0033104 A1 | 2/2003 | Gooche |
| 2003/0053037 A1 | 3/2003 | Blaesing-Bangert et al. |
| 2003/0125901 A1 | 7/2003 | Steffey et al. |
| 2003/0142631 A1 | 7/2003 | Silvester |
| 2003/0167647 A1 | 9/2003 | Raab et al. |
| 2003/0172536 A1 | 9/2003 | Raab et al. |
| 2003/0172537 A1 | 9/2003 | Raab et al. |
| 2003/0208919 A1 | 11/2003 | Raab et al. |
| 2003/0221326 A1 | 12/2003 | Raab et al. |
| 2004/0022416 A1 | 2/2004 | Lemelson et al. |
| 2004/0040166 A1 | 3/2004 | Raab et al. |
| 2004/0103547 A1 | 6/2004 | Raab et al. |
| 2004/0111908 A1 | 6/2004 | Raab et al. |
| 2004/0139265 A1 | 7/2004 | Hocker et al. |
| 2004/0162700 A1 | 8/2004 | Rosenberg et al. |
| 2004/0259533 A1 | 12/2004 | Nixon et al. |
| 2005/0016008 A1 | 1/2005 | Raab et al. |
| 2005/0028393 A1 | 2/2005 | Raab et al. |
| 2005/0085940 A1 | 4/2005 | Griggs et al. |
| 2005/0115092 A1 | 6/2005 | Raab et al. |
| 2005/0144799 A1 | 7/2005 | Raab et al. |
| 2005/0151963 A1 | 7/2005 | Pulla et al. |
| 2005/0166413 A1 | 8/2005 | Crampton |
| 2005/0188557 A1 | 9/2005 | Raab et al. |
| 2005/0259271 A1 | 11/2005 | Christoph |
| 2005/0276466 A1 | 12/2005 | Vaccaro et al. |
| 2005/0283989 A1 | 12/2005 | Pettersson |
| 2006/0016086 A1 | 1/2006 | Raab et al. |
| 2006/0017720 A1 | 1/2006 | Li |
| 2006/0026851 A1 | 2/2006 | Raab et al. |
| 2006/0028203 A1 | 2/2006 | Kawashima et al. |
| 2006/0053647 A1 | 3/2006 | Raab et al. |
| 2006/0056459 A1 | 3/2006 | Stratton et al. |
| 2006/0056559 A1 | 3/2006 | Pleasant et al. |
| 2006/0059270 A1 | 3/2006 | Pleasant et al. |
| 2006/0096108 A1 | 5/2006 | Raab et al. |
| 2006/0103853 A1 | 5/2006 | Palmateer |
| 2006/0123649 A1 | 6/2006 | Muller |
| 2006/0129349 A1 | 6/2006 | Raab et al. |
| 2006/0169050 A1 | 8/2006 | Kobayashi et al. |
| 2006/0169608 A1 | 8/2006 | Carnevali |
| 2006/0287769 A1 | 12/2006 | Yanagita et al. |
| 2006/0291970 A1 | 12/2006 | Granger |
| 2007/0030841 A1 | 2/2007 | Lee et al. |
| 2007/0043526 A1 | 2/2007 | De Jonge et al. |
| 2007/0050774 A1 | 3/2007 | Eldson et al. |
| 2007/0055806 A1 | 3/2007 | Stratton et al. |
| 2007/0058162 A1 | 3/2007 | Granger |
| 2007/0097382 A1 | 5/2007 | Granger |
| 2007/0105238 A1 | 5/2007 | Mandl et al. |
| 2007/0142970 A1 | 6/2007 | Burbank et al. |
| 2007/0147265 A1 | 6/2007 | Eidson |
| 2007/0147435 A1 | 6/2007 | Hamilton et al. |
| 2007/0147562 A1 | 6/2007 | Eidson |
| 2007/0153297 A1 | 7/2007 | Lau |
| 2007/0163134 A1 | 7/2007 | Eaton |
| 2007/0176648 A1 | 8/2007 | Baer |
| 2007/0177016 A1 | 8/2007 | Wu |
| 2007/0183459 A1 | 8/2007 | Eidson |
| 2007/0185682 A1 | 8/2007 | Eidson |
| 2007/0217169 A1 | 9/2007 | Yeap et al. |
| 2007/0217170 A1 | 9/2007 | Yeap et al. |
| 2007/0221522 A1 | 9/2007 | Yamada et al. |
| 2007/0223477 A1 | 9/2007 | Eidson |
| 2007/0248122 A1 | 10/2007 | Hamilton |
| 2007/0256311 A1 | 11/2007 | Ferrari |
| 2007/0257660 A1 | 11/2007 | Pleasant et al. |
| 2007/0258378 A1 | 11/2007 | Hamilton |
| 2007/0282564 A1 | 12/2007 | Sprague et al. |
| 2008/0046221 A1 | 2/2008 | Stathis |
| 2008/0052936 A1 | 3/2008 | Briggs et al. |
| 2008/0066583 A1 | 3/2008 | Lott |
| 2008/0068103 A1 | 3/2008 | Cutler |
| 2008/0080562 A1 | 4/2008 | Burch et al. |
| 2008/0096108 A1 | 4/2008 | Sumiyama et al. |
| 2008/0098272 A1 | 4/2008 | Fairbanks et al. |
| 2008/0148585 A1 | 6/2008 | Raab et al. |
| 2008/0154538 A1 | 6/2008 | Stathis |
| 2008/0179206 A1 | 7/2008 | Feinstein et al. |
| 2008/0183065 A1 | 7/2008 | Goldbach |
| 2008/0196260 A1 | 8/2008 | Pettersson |
| 2008/0204699 A1 | 8/2008 | Benz et al. |
| 2008/0216552 A1 | 9/2008 | Ibach et al. |
| 2008/0228331 A1 | 9/2008 | McNerney et al. |
| 2008/0232269 A1 | 9/2008 | Tatman et al. |
| 2008/0235969 A1 | 10/2008 | Jordil et al. |
| 2008/0235970 A1 | 10/2008 | Crampton |
| 2008/0240321 A1 | 10/2008 | Narus et al. |
| 2008/0245452 A1 | 10/2008 | Law et al. |
| 2008/0246943 A1 | 10/2008 | Kaufman et al. |
| 2008/0252671 A1 | 10/2008 | Cannell et al. |
| 2008/0256814 A1 | 10/2008 | Pettersson |
| 2008/0257023 A1 | 10/2008 | Jordil et al. |
| 2008/0263411 A1 | 10/2008 | Baney et al. |
| 2008/0271332 A1 | 11/2008 | Jordil et al. |
| 2008/0282564 A1 | 11/2008 | Pettersson |
| 2008/0295349 A1 | 12/2008 | Uhl et al. |
| 2008/0298254 A1 | 12/2008 | Eidson |
| 2008/0309460 A1 | 12/2008 | Jefferson et al. |
| 2009/0000136 A1 | 1/2009 | Crampton |
| 2009/0016475 A1 | 1/2009 | Rischar et al. |

| | | | | | | |
|---|---|---|---|---|---|---|
| 2009/0031575 A1 | 2/2009 | Tomelleri | DE | 10026357 | | 1/2002 |
| 2009/0046140 A1 | 2/2009 | Lashmet et al. | DE | 202005000983 | U1 | 4/2005 |
| 2009/0046895 A1 | 2/2009 | Pettersson et al. | DE | 102004015668 | B3 | 9/2005 |
| 2009/0049704 A1 | 2/2009 | Styles et al. | DE | 19720049 | B4 | 1/2006 |
| 2009/0083985 A1 | 4/2009 | Ferrari | DE | 10114126 | B4 | 8/2006 |
| 2009/0089004 A1 | 4/2009 | Vook et al. | DE | 102004010083 | B4 | 11/2006 |
| 2009/0089078 A1 | 4/2009 | Byrsey | DE | 102005060967 | A1 | 6/2007 |
| 2009/0089233 A1 | 4/2009 | Gach et al. | DE | 102006023902 | | 11/2007 |
| 2009/0089623 A1 | 4/2009 | Neering et al. | DE | 102006035292 | | 1/2008 |
| 2009/0109797 A1 | 4/2009 | Eidson | DE | 102008039838 | | 3/2010 |
| 2009/0113183 A1 | 4/2009 | Barford et al. | DE | 102005036929 | B4 | 6/2010 |
| 2009/0113229 A1 | 4/2009 | Cataldo et al. | DE | 102008062763 | B3 | 7/2010 |
| 2009/0122805 A1 | 5/2009 | Epps et al. | DE | 102009001894 | | 9/2010 |
| 2009/0125196 A1 | 5/2009 | Velazquez et al. | EP | 0546784 | A2 | 6/1993 |
| 2009/0139105 A1 | 6/2009 | Granger | EP | 0730210 | A1 | 9/1996 |
| 2009/0157419 A1 | 6/2009 | Bursey | EP | 0614517 | | 3/1997 |
| 2009/0165317 A1 | 7/2009 | Little | EP | 1160539 | | 12/2001 |
| 2009/0177435 A1 | 7/2009 | Heininen | EP | 1189124 | | 3/2002 |
| 2009/0177438 A1 | 7/2009 | Raab | EP | 0767357 | B1 | 5/2002 |
| 2009/0187373 A1 | 7/2009 | Atwell et al. | EP | 1361414 | A1 | 11/2003 |
| 2009/0241360 A1 | 10/2009 | Tait et al. | EP | 1468791 | A1 | 10/2004 |
| 2009/0249634 A1 | 10/2009 | Pettersson | EP | 1669713 | A1 | 6/2006 |
| 2009/0265946 A1 | 10/2009 | Jordil et al. | EP | 1734425 | A2 | 12/2006 |
| 2010/0040742 A1 | 2/2010 | Dijkhuis et al. | EP | 1429109 | | 4/2007 |
| 2010/0057392 A1 | 3/2010 | York | EP | 1764579 | | 12/2007 |
| 2010/0078866 A1 | 4/2010 | Pettersson | EP | 1878543 | | 1/2008 |
| 2010/0095542 A1 | 4/2010 | Ferrari | EP | 1967930 | A2 | 9/2008 |
| 2010/0122920 A1 | 5/2010 | Butter et al. | EP | 2023077 | A1 | 2/2009 |
| 2010/0123892 A1 | 5/2010 | Miller et al. | EP | 2060530 | A1 | 5/2009 |
| 2010/0128259 A1 | 5/2010 | Bridges et al. | EP | 2068067 | A1 | 6/2009 |
| 2010/0134596 A1 | 6/2010 | Becker | EP | 2108917 | A1 | 10/2009 |
| 2010/0148013 A1 | 6/2010 | Bhotika et al. | FR | 2935043 | A1 | 2/2010 |
| 2010/0208062 A1 | 8/2010 | Pettersson | GB | 894320 | | 4/1962 |
| 2010/0277747 A1 | 11/2010 | Rueb et al. | GB | 2255648 | A | 11/1992 |
| 2010/0281705 A1 | 11/2010 | Verdi et al. | GB | 2341203 | A | 3/2000 |
| 2010/0286941 A1 | 11/2010 | Merlot | GB | 2420241 | A | 5/2006 |
| 2010/0312524 A1 | 12/2010 | Siercks et al. | GB | 2452033 | A | 2/2009 |
| 2010/0318319 A1 | 12/2010 | Maierhofer | JP | 5581525 | | 6/1955 |
| 2010/0325907 A1 | 12/2010 | Tait | JP | 5827264 | | 2/1983 |
| 2011/0007305 A1 | 1/2011 | Bridges et al. | JP | 6313710 | A | 11/1994 |
| 2011/0007326 A1 | 1/2011 | Daxauer et al. | JP | 7210586 | A | 8/1995 |
| 2011/0013199 A1 | 1/2011 | Siercks et al. | JP | 2003194526 | | 7/2003 |
| 2011/0019155 A1 | 1/2011 | Daniel et al. | JP | 2004257927 | A | 9/2004 |
| 2011/0023578 A1 | 2/2011 | Grasser | JP | 2005517908 | | 6/2005 |
| 2011/0043515 A1 | 2/2011 | Stathis | JP | 2006241833 | | 9/2006 |
| 2011/0094908 A1 | 4/2011 | Trieu | JP | 2006301991 | A | 11/2006 |
| 2011/0107611 A1 | 5/2011 | Desforges et al. | JP | 2009524057 | | 6/2009 |
| 2011/0107612 A1 | 5/2011 | Ferrari et al. | WO | 9208568 | A1 | 5/1992 |
| 2011/0107613 A1 | 5/2011 | Tait | WO | 9808050 | | 2/1998 |
| 2011/0107614 A1 | 5/2011 | Champ | WO | 9910706 | A1 | 3/1999 |
| 2011/0111849 A1 | 5/2011 | Sprague et al. | WO | 0014474 | | 3/2000 |
| 2011/0112786 A1 | 5/2011 | Desforges et al. | WO | 0033149 | | 6/2000 |
| 2011/0164114 A1 | 7/2011 | Kobayashi et al. | WO | 0034733 | | 6/2000 |
| 2011/0166824 A1 | 7/2011 | Haisty et al. | WO | 02101323 | A2 | 12/2002 |
| 2011/0169924 A1 | 7/2011 | Haisty et al. | WO | 2004096502 | A1 | 11/2004 |
| 2011/0173827 A1 | 7/2011 | Bailey et al. | WO | 2005072917 | A1 | 8/2005 |
| 2011/0173828 A1 | 7/2011 | York | WO | 2005075875 | | 8/2005 |
| 2011/0178755 A1 | 7/2011 | York | WO | 2005100908 | A1 | 10/2005 |
| 2011/0178762 A1 | 7/2011 | York | WO | 2006051264 | A1 | 5/2006 |
| 2011/0178764 A1 | 7/2011 | York | WO | 2007002319 | A1 | 1/2007 |
| 2011/0178765 A1 | 7/2011 | Atwell et al. | WO | 2007028941 | A1 | 3/2007 |
| 2011/0192043 A1 | 8/2011 | Ferrari | WO | 2007125081 | A1 | 11/2007 |
| 2011/0273568 A1 | 11/2011 | Lagassey | WO | 2007144906 | A1 | 12/2007 |
| 2012/0181194 A1 | 7/2012 | McEwan et al. | WO | 2008027588 | A2 | 3/2008 |
| 2012/0210678 A1 | 8/2012 | Alcouloumre et al. | WO | 2008047171 | | 4/2008 |
| 2012/0260611 A1 | 10/2012 | Jones | WO | 2008064276 | A3 | 5/2008 |
| 2013/0025143 A1 | 1/2013 | Bailey et al. | WO | 2008066896 | | 6/2008 |
| 2013/0025144 A1 | 1/2013 | Briggs et al. | WO | 2008075170 | A1 | 6/2008 |
| 2013/0062243 A1 | 3/2013 | Chang et al. | WO | 2008157061 | A1 | 12/2008 |
| | | | WO | 2009001165 | A1 | 12/2008 |
| FOREIGN PATENT DOCUMENTS | | | WO | 2009016185 | A1 | 2/2009 |
| CN | 2665668 | 12/2004 | WO | 2009083452 | A1 | 7/2009 |
| CN | 1818537 | 8/2006 | WO | 2009127526 | A1 | 10/2009 |
| CN | 201266071 | 7/2009 | WO | 2009130169 | A1 | 10/2009 |
| DE | 3245060 A1 | 7/1983 | WO | 2009149740 | A1 | 12/2009 |
| DE | 4410775 A1 | 10/1995 | WO | 2010040742 | A1 | 4/2010 |
| DE | 29622033 | 2/1997 | WO | 2010092131 | A1 | 8/2010 |
| DE | 19543763 A1 | 5/1997 | WO | 2010108089 | A2 | 9/2010 |
| DE | 19820307 A1 | 11/1999 | WO | 2010148525 | A1 | 12/2010 |

| WO | 2011000435 A1 | 1/2011 |
| WO | 2011000955 A1 | 1/2011 |
| WO | 2011057130 A2 | 5/2011 |
| WO | 2012038446 | 3/2012 |

OTHER PUBLICATIONS

Examination Report under Section 18(3); Report dated Nov. 6, 2012; Application No. GB1210306.5.
A. Hart; "Kinematic Coupling Interchangibility" Precision Engineering; vol. 28, No. 1; Jan. 1, 2004 pp. 1-15.
ABB Flexibile Automation AB: "Product Manual IRB 6400R M99, On-line Manual"; Sep. 13, 2006; XP00002657684; Retrieved from the Internet: URL: http://pergatory.mit.edu/kinematiccouplings/case_studies/ABB_Robotics/general/6400R%20Product%20Manual.pdf (retrieved Aug. 26, 2011).
Anonymous : So wird's gemacht: Mit T-DSL und Windows XP Home Edition gemeinsam ins Internet (Teil 3) Internet Citation, Jul. 2003, XP002364586, Retrieved from Internet: URL:http://support.microsfot.com/kb/814538/DE/ [retrieved on Jan. 26, 2006]eh whole document.
GoMeasure3D—Your source for all things measurement, Baces 3D 100 Series Portable CMM from GoMeasure3D, [online], [retrieved Nov. 29, 2011], http://www.gomeasure3d.com/baces100.html.
Cho, et al., Implementation of a Precision Time Protocol over Low Rate Wireless Personal Area Networks, IEEE, 2008.
Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007.
Information on Electro-Optical Information Systems; EOIS 3D Mini-Moire C.M.M. Sensor for Non-Contact Measuring & Surface Mapping; Direct Dimensions, Jun. 1995.
Dylan, Craig R., High Precision Makes the Massive Bay Bridge Project Work. Suspended in MidAir—Cover Story—Point of Beginning, Jan. 1, 2010, [online] http://www.pobonline.com/Articles/Cover_Story/BNP_GUID_9-5-2006_A_10000000000 . . . [Retreived Jan. 25, 2010].
Franklin, Paul F., What IEEE 1588 Means for Your Next T&M System Design, Keithley Instruments, Inc., [on-line] Oct. 19, 2010, http://www.eetimes.com/General/DisplayPrintViewContent?contentItemId=4209746, [Retreived Oct. 21, 2010].
It is Alive in the Lab, Autodesk University, Fun with the Immersion MicroScribe Laser Scanner, [online], [retrieved Nov. 29, 2011], http://labs.blogs.com/its_alive_in_the_lab/2007/11/fun-with-the-im.html.
Ghost 3D Systems, Authorized MicroScribe Solutions, FAQs—MicroScribe 3D Laser, MicroScan Tools, & related info, [online], [retrieved Nov. 29, 2011], http://microscribe.ghost3d.com/gt_microscan-3d_faqs.htm.
Electro-Optical Information Systems, "The Handy Handheld Digitizer" [online], [retrieved on Nov. 29, 2011], http://vidibotics.com/htm/handy.htm.
HYDROpro Navigation, Hydropgraphic Survey Software, Trimble, www.trimble.com, Copyright 1997-2003.
Written Opinion of the International Searching Authority for International Application No. PCT/US2011/021252 mailed Apr. 27, 2011.
Written Opinion of the International Searching Authority for International Application No. PCT/US2011/021250 mailed Apr. 18, 2011.
International Preliminary Report on Patentability for PCT/US2011/021274; Date of Completion Apr. 12, 2012.
International Preliminary Report on Patentability mailed May 9, 2012 for International Application Serial No. PCT/US2011/021253 International filing date Jan. 14, 2011. Date of Completion May 9, 2012.
International Search Report for International Application No. PCT/2011/020625 mailed Feb. 25, 2011.
International Search Report for International Application No. PCT/US2011/021270 mailed May 2, 2011.
International Search Report for International Application No. PCT/US2011/021274 mailed May 6, 2011.
International Search Report for International Application No. PCT/US2011/021276 mailed May 17, 2011.
International Search Report for International Application No. PCT/US2011/021246 mailed Apr. 12, 2011.
International Search Report for International Application No. PCT/US2011/021248 mailed Sep. 19, 2011.
International Search Report for International Application No. PCT/US2011/021249 mailed Apr. 21, 2011.
Internation Search Report for International Application No. PCT/US2011/021250 mailed Apr. 18, 2011.
International Search Report for International Application No. PCT/US2011/021252 mailed Apr. 27, 2011.
International Search Report for International Application No. PCT/US2011/021253 mailed Sep. 26, 2011.
International Search Report for International Application No. PCT/US2011/021259 mailed May 25, 2011.
International Search Report for International Application No. PCT/US2011/021262 mailed May 11, 2011.
International Search Report for International Application No. PCT/US2011/021263 mailed May 4, 2011.
International Search Report for International Application No. PCT/US2011/021264 mailed May 31, 2011.
International Search Report for International Application No. PCT/US2011/021272 mailed Apr. 7, 2011.
International Search Report for International Application No. PCT/US2011/021273 mailed Apr. 20, 2011.
International Search Report for International Application No. PCT/US2011/021278 mailed May 25, 2011.
International Search Report for International Application No. PCT/US2011/021794 mailed Sep. 23, 2011.
International Search Report for International Application No. PCT/US2011/050787; Mailing date Mar. 11, 2011.
Jasperneite, et al., Enhancements to the Time Synchronization Standard IEEE-1588 for a System of Cascaded Bridges, IEEE, 2004.
Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html.
MicroScan 3D User Guide, RSI GmbH, 3D Systems & Software, Oberursel, Germany, email: info@rsi-gmbh.de, Copyright RSI Roland Seifert Imaging GmbH 2008.
Patrick Willoughby; "Elastically Averaged Precision Alignment"; In: "Doctoral Thesis"; Jun. 1, 2005; Massachusetts Institute of Technology; XP55005620; Abstract 1.1 Motivation; Chapter 3, Chapter 6.
Romer Absolute Arm Maximum Performance Portable Measurement.
Romer Romer Absolute Arm Product Brochure: (2010); Hexagon Metrology; www.hexagonmetrology.com; Hexagon AB, 2010.
Sauter, et al., Towards New Hybrid Networks for Industrial Automation, IEEE, 2009.
Spada, et al., IEEE 1588 Lowers Integration Costs in Continuous Flow Automated Production Lines, XP-002498255, ARC Insights, Insight # 2003-33MD&H, Aug. 20, 2003.
Trimble—Trimble SPS630, SPS730 and SPS930 Universal Total Stations, [on-line] http://www.trimble.com/sps630_730_930.shtml (1 of 4), [Retreived Jan. 26, 2010 8:50:29 AM].
Written Opinion of the International Searching Authority for International Application No. PCT/US2011/021246 mailed Apr. 12, 2011.
Written Opinion of the International Searching Authority for International Application No. PCT/US2011/021248 mailed Sep. 19, 2011.
Written Opinion of the International Searching Authority for International Application No. PCT/US2011/021249 mailed Apr. 21, 2011.
Written Opinion of the International Searching Authority for International Application No. PCT/US2011/021264 mailed May 31, 2011.
Written Opinion of the International Searching Authority for International Application No. PCT/US2011/021272 mailed Apr. 7, 2011.
Written Opinion of the International Searching Authority for International Application No. PCT/US2011/021253 mailed Sep. 26, 2011.
Written Opinion of the International Searching Authority for International Application No. PCT/US2011/021259 mailed May 25, 2011.

Written Opinion of the International Searching Authority for International Application No. PCT/US2011/021262 mailed May 11, 2011.
Written Opinion of the International Searching Authority for International Application No. PCT/US2011/021263 mailed May 4, 2011.
Written Opinion of the International Searching Authority for International Application No. PCT/US2011/021273 mailed Apr. 20, 2011.
Written Opinion of the International Searching Authority for International Application No. PCT/US2011/021278 mailed May 25, 2011.
Written Opinion of the International Searching Authority for International Application No. PCT/US2011/021794 mailed Sep. 23, 2011.
Written Opinion of the International Searching Authority for International Application No. PCT/US2011/050787 mailed Mar. 11, 2011.
Written Opinion of the International Searching Authority for International Application No. PCT/US2011/021253 mailed Mar. 22, 2012.
Written Opinion of the International Searching Authority for International Application No. PCT/US2011/020625 mailed Feb. 25, 2011.
Written Opinion of the International Searching Authority for International Application No. PCT/US2011/021270 mailed May 2, 2011.
Written Opinion of the International Searching Authority for International Application No. PCT/US2011/021274 mailed May 6, 2011.
Written Opinion of the International Searching Authority for International Application No. PCT/US2011/021276 mailed May 17, 2011.
Laser Reverse Engineering with Microscribe, [online], [retrieved Nov. 29, 2011], http://www.youtube.com/watch?v=8VRz_2aEJ4E&feature=PlayList&p=F63ABF74F30DC81B&playnext=1&playnext_from=PL&index=1.
International Preliminary Report on Patentability for International Application Serial No. PCT/US2011/021246 International filing date Jan. 14, 2011. Date of Issuance Jul. 24, 2012.
International Preliminary Report on Patentability for International Application Serial No. PCT/US2011/021249 International filing date Jan. 14, 2011. Date of Issuance Jul. 24, 2012.
International Preliminary Report on Patentability for International Application Serial No. PCT/US2011/021250 International filing date Jan. 14, 2011. Date of Issuance Jul. 24, 2012.
International Preliminary Report on Patentability for International Application Serial No. PCT/US2011/021252 International filing date Jan. 14, 2011. Date of Issuance Jul. 24, 2012.
International Preliminary Report on Patentability for International Application Serial No. PCT/US2011/021247 International filing date Jan. 14, 2011. Date of Issuance Jul. 24, 2012.
International Preliminary Report on Patentability for International Application Serial No. PCT/US2011/021259. International filing date Jan. 14, 2011. Date of Issuance Jul. 24, 2012.
International Preliminary Report on Patentability for International Application Serial No. PCT/US2011/021262. International filing date Jan. 14, 2011. Date of Issuance Jul. 24, 2012.
International Preliminary Report on Patentability for International Application Serial No. PCT/US2011/021263. International filing date Jan. 14, 2011. Date of Issuance Jul. 24, 2012.
International Preliminary Report on Patentability for International Application Serial No. PCT/US2011/021264. International filing date Jan. 14, 2011. Date of Issuance Jul. 24, 2012.
International Preliminary Report on Patentability for International Application Serial No. PCT/US2011/021270. International filing date Jan. 14, 2011. Date of Issuance Jul. 24, 2012.
International Preliminary Report on Patentability for International Application Serial No. PCT/US2011/021272. International filing date Jan. 14, 2011. Date of Issuance Jul. 24, 2012.
International Preliminary Report on Patentability for International Application Serial No. PCT/US2011/021273. International filing date Jan. 14, 2011. Date of Issuance Jul. 24, 2012.
International Preliminary Report on Patentability for International Application Serial No. PCT/US2011/021276. International filing date Jan. 14, 2011. Date of Issuance Jul. 24, 2012.
International Preliminary Report on Patentability for International Application Serial No. PCT/US2011/021278. International filing date Jan. 14, 2011. Date of Issuance Jul. 24, 2012.
International Preliminary Report on Patentability for International Application Serial No. PCT/US2011/021794. International filing date Jan. 20, 2011. Date of Issuance Jul. 24, 2012.
International Preliminary Report on Patentability for PCT/US2011/020625; Date of Issuance Jul. 17, 2012.
International Search Report for International Application No. PCT/US2011/021247 mailed Aug. 26, 2011.
Written Opinion of the International Searching Authority for International Application No. PCT/US2011/021247 mailed Aug. 26, 2011.
German Office Action and English Language summary for DE 112011100292.0 filed Jul. 3, 2012, based on PCT Application US2011/021252 filed Jan. 14, 2011.
German Office Action for Patent Application No. 11 2011 100 291.2 dated Dec. 20, 2012. All art cited within.
Japanese Office Action and English Language summary for JP2012-550042 filed Jul. 20, 2012; based on International Application No. PCT/US2011/021249 filed Jan. 14, 2011.
Japanese Office Action and English Language summary for JP2012-550044 filed Jul. 20, 2012; based on International Application No. PCT/US2011/021252 filed Jan. 14, 2011.
Japanese Office Action and English Language summary for JP2012-550043 filed Jul. 20, 2012; based on International Application No. PCT/US2011/021250 filed Jan. 14, 2011.
Examination Report for German Application No. 11 2011 100 193.2 Report dated Dec. 20, 2012; based on PCT/US2011/021249.
Faro Product Catalog; Faro Arm; 68 pages; Faro Technologies Inc. 2009; printed Aug. 3, 2009.
Romer Measuring Arms; Portable CMMs for the shop floor; 20 pages; Hexagon Metrology, Inc. (2009) http//us.ROMER.com.
International Search Report of the International Searching Authority for Application No. PCT/US2013/022186; Date of Mailing: May 29, 2013.
Written Opinion of the International Searching Authority for Application No. PCT/US2013/022186; Date of Mailing: May 29, 2013.
MG Lee; "Compact 3D LIDAR based on optically coupled horizontal and vertical Scanning mechanism for the autonomous navigation of robots" (13 pages) vol. 8037; downloaded from http://proceedings.spiedigitallibrary.org/ on Jul. 2, 2013.
P. Ben-Tzvi, et al "Extraction of 3D Images Using Pitch-Actuated 2D Laser Range Finder for Robotic Vision" (6 pages) BNSDOCID <XP 31840390A_1_>.
International Search Report for International Application No. PCT/US2013/040321 mailed Jul. 15, 2013.
YK Cho, et al. "Light-weight 3D LADAR System for Construction Robotic Operations" (pp. 237-244); 26th International Symposium on Automation and Robotics in Construction (ISARC 2009).
Written Opinion for International Application No. PCT/US2013/040321 mailed Jun. 15, 2013.
Romer "Romer Measuring Arms Portable CMMs for R&D and shop floor" (Mar. 2009) Hexagon Metrology (16 pages).
Examination Report for German Application No. 11 2011 100 290.4 Report dated Jul. 16, 2013; based on PCT/US2011/021247.
International Search Report for International Application No. PCT/US2013/040309 mailed Jul. 15, 2013.
Written Opinion for International Application No. PCT/US2013/040309 mailed Jul. 15, 2013.

* cited by examiner

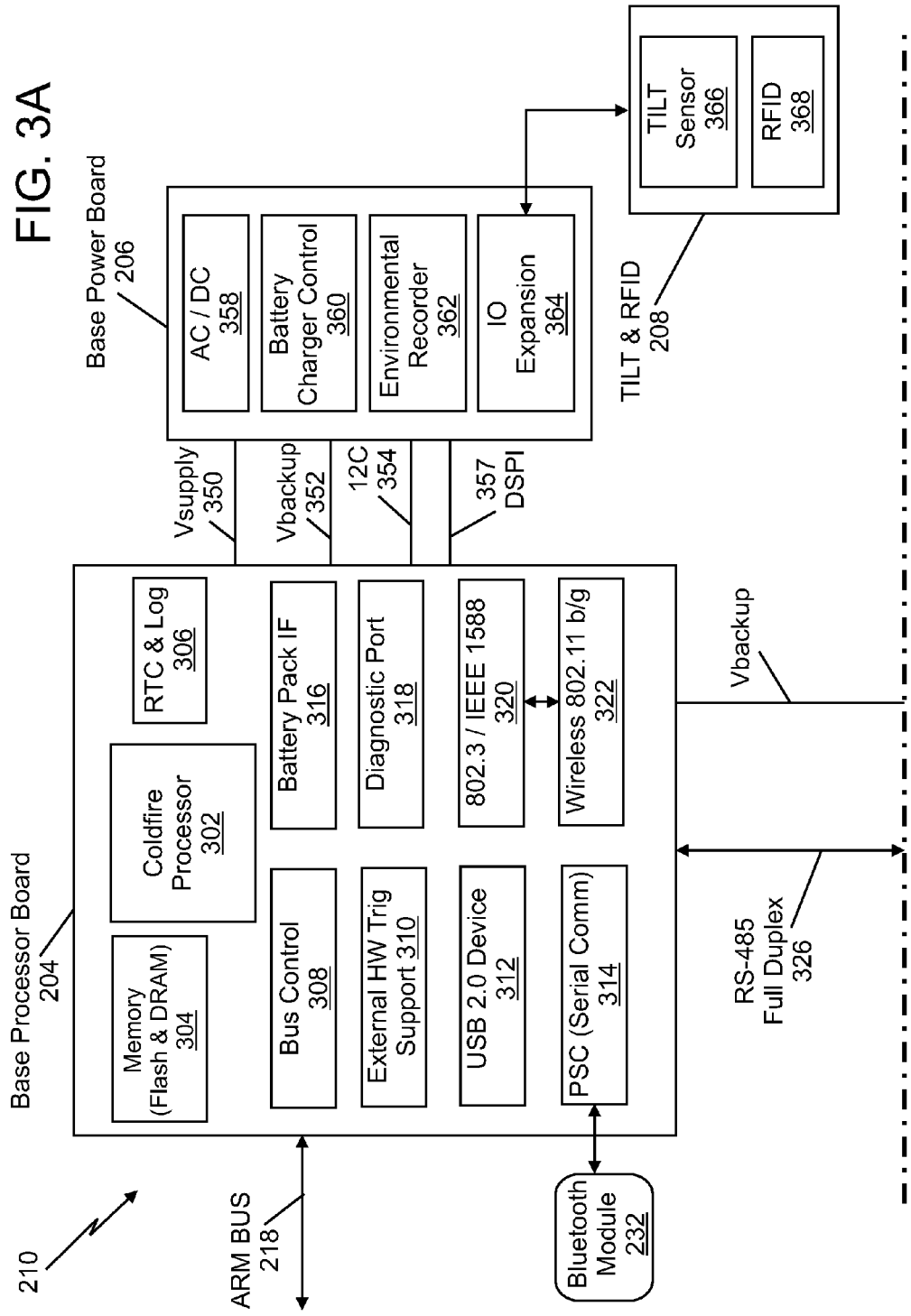

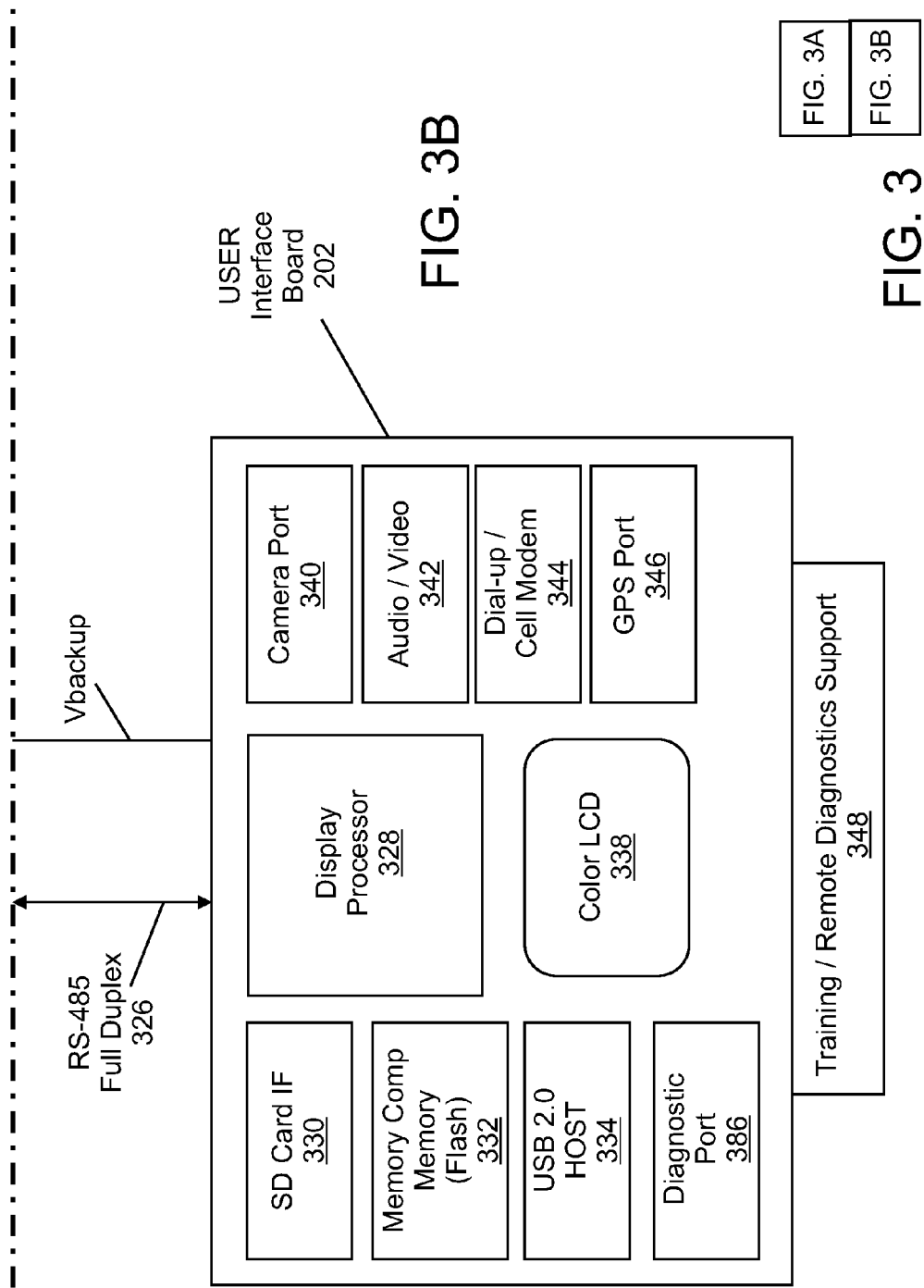

COORDINATE MEASURING MACHINE HAVING AN ILLUMINATED PROBE END AND METHOD OF OPERATION

CROSS-REFERENCE TO RELATED APPLICATIONS

The present application is a continuation application of U.S. patent application Ser. No. 13/006,471 filed on Jan. 14, 2011, which claims the benefit of Provisional Application Ser. No. 61/296,555 filed Jan. 20, 2010 and Provisional Application Ser. No. 61/362,497 filed Jul. 8, 2010, the contents of which are hereby incorporated by reference in its entirety.

BACKGROUND

The present disclosure relates to a coordinate measuring machine, and more particularly to a portable articulated arm coordinate measuring machine having targeted area illumination features integrated into the probe end of the portable coordinate measuring machine.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art AACMM is disclosed in commonly assigned U.S. Pat. No. 5,402,582 ('582), which is incorporated herein by reference in its entirety. The '582 patent discloses a 3-D measuring system comprised of a manually-operated AACMM having a support base on one end and a measurement probe at the other end. Commonly assigned U.S. Pat. No. 5,611,147 ('147), which is incorporated herein by reference in its entirety, discloses a similar AACMM. In the '147 patent, the AACMM includes a number of features including an additional rotational axis at the probe end, thereby providing for an arm with either a two-two-two or a two-two-three axis configuration (the latter case being a seven axis arm).

When manipulating a probe at the end of an AACMM, it is often desirable for the operator of the AACMM to work or see within part of a cavity, underneath a lip on a part for example. These or other relatively difficult to access positions often result in the surface of the part being in a shadow. It should be appreciated that this positioning sometimes makes it relatively difficult for the operator of the AACMM to properly discern features of the part being accessed by the probe for measurement. Oftentimes supplemental illumination apart from the arm of the AACMM is provided in the form of portable work lights, head mounted lights, or a hand-held light. However, these can be cumbersome for the operator of the AACMM to use, and may require additional time or manpower to set up and operate.

While existing AACMM's are suitable for their intended purposes, what is needed is a portable AACMM that has certain features of embodiments of the present invention. In particular, what is needed is an effective solution for the illumination of relatively difficult to illuminate part locations through use of targeted area illumination.

SUMMARY OF THE INVENTION

In accordance with one embodiment of the invention, a portable articulated arm coordinate measuring machine (AACMM) is provided. The AACMM includes a manually positionable articulated arm portion having opposed first and second ends, the arm portion including a plurality of connected arm segments, each of the arm segments including at least one position transducer for producing a position signal. A measurement device is coupled to the first end. An electronic circuit is provided for receiving the position signals from the transducers and for providing data corresponding to a position of the measurement device. A probe end section is coupled between the measurement device and the first end. At least one light source arranged at an interface between the probe end section and the measurement device, wherein the at least one light source is disposed to project visible light adjacent the measurement device.

According to another embodiment of the invention, an AACMM is provided. The AACMM includes a manually positionable articulated arm portion having opposed first and second ends, the arm portion including a plurality of connected arm segments, each of the arm segments including at least one position transducer for producing a position signal. A measurement device attached to a first end of the AACMM. an electronic circuit is provided for receiving the position signals from the transducers and for providing data corresponding to a position of the measurement device. A probe end section is coupled to the first end. At least one light source is arranged distal to the first end and operably coupled to the probe end section, wherein the at least one light source projects light adjacent to the measurement device to facilitate viewing of a part being measured by the AACMM.

According to another embodiment of the invention, another AACMM is provided. The AACMM includes a manually positionable articulated arm portion having opposed first and second ends, the arm portion including a plurality of connected arm segments, each of the arm segments including at least one position transducer for producing a position signal. A measurement device is coupled to a first end of the AACMM, the measurement device having a body, the body including at least one opening. An electronic circuit is provided for receiving the position signals from the transducers and for providing data corresponding to a position of the measurement device. A probe end section is disposed between the first end and the measurement device, the probe end section having a housing and a handle. A light source having at least one LED is operably coupled to the probe end section, wherein the light source cooperates with the at least one opening and projects visible light from the opening to facilitate viewing of a part being measured by the AACMM.

According to another embodiment of the invention, another AACMM is provided. The AACMM includes a manually positionable articulated arm having opposed first and second ends, the arm including a plurality of connected arm segments, each of the arm segments including at least one position transducer for producing a position signal. A measurement device is coupled to the first end. At least one light source is disposed on the portable articulated arm coordinate measuring machine, wherein the at least one light source has an adjustable color projected to illuminate a region adjacent to the measurement device. An electronic circuit is provided that receives the position signals from the transducers, provides data corresponding to a position of the measurement device, and controls the adjustable color.

According to another embodiment of the invention, another AACMM is provided. The AACMM includes a manually positionable articulated arm portion having opposed first and second ends, the arm portion including a plurality of connected arm segments, each of the arm segments including at least one position transducer for producing position signals. A probe end section is coupled to the first end. A measurement device is attached to an end of the probe end section distal the first end. An electronic circuit is provided for receiving the position signals from the transducers and for providing data corresponding to a position of the measurement device. A handle is coupled to a middle portion of the probe end section, wherein the middle portion is disposed between the measurement device and the first end. At least one light source is operably coupled to the handle on a side adjacent the measurement device, wherein the at least one light source projects light adjacent to the measurement device to facilitate viewing of a part being measured by the AACMM.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including

FIG. 3, including FIGS. 3A and 3B taken together, is a block diagram describing detailed features of the electronic data processing system of FIG. 2 in accordance with an embodiment;

DETAILED DESCRIPTION

It is desirable to have a portable articulated arm coordinate measuring machine that provides illumination and visual feedback to the operator. Embodiments of the present invention include advantages of an integrated light source that directs light onto a measurement device and the surrounding area. Other embodiments of the present invention include advantages in providing a visual indication to the operator of the status of the coordinate measurement machine with a colored light source on a probe end. Still other embodiments of the invention include advantages of a light source coupled with a sensor to provide the operator with a visual feedback of a measured parameter associated with the measured object.

Figure 1A:
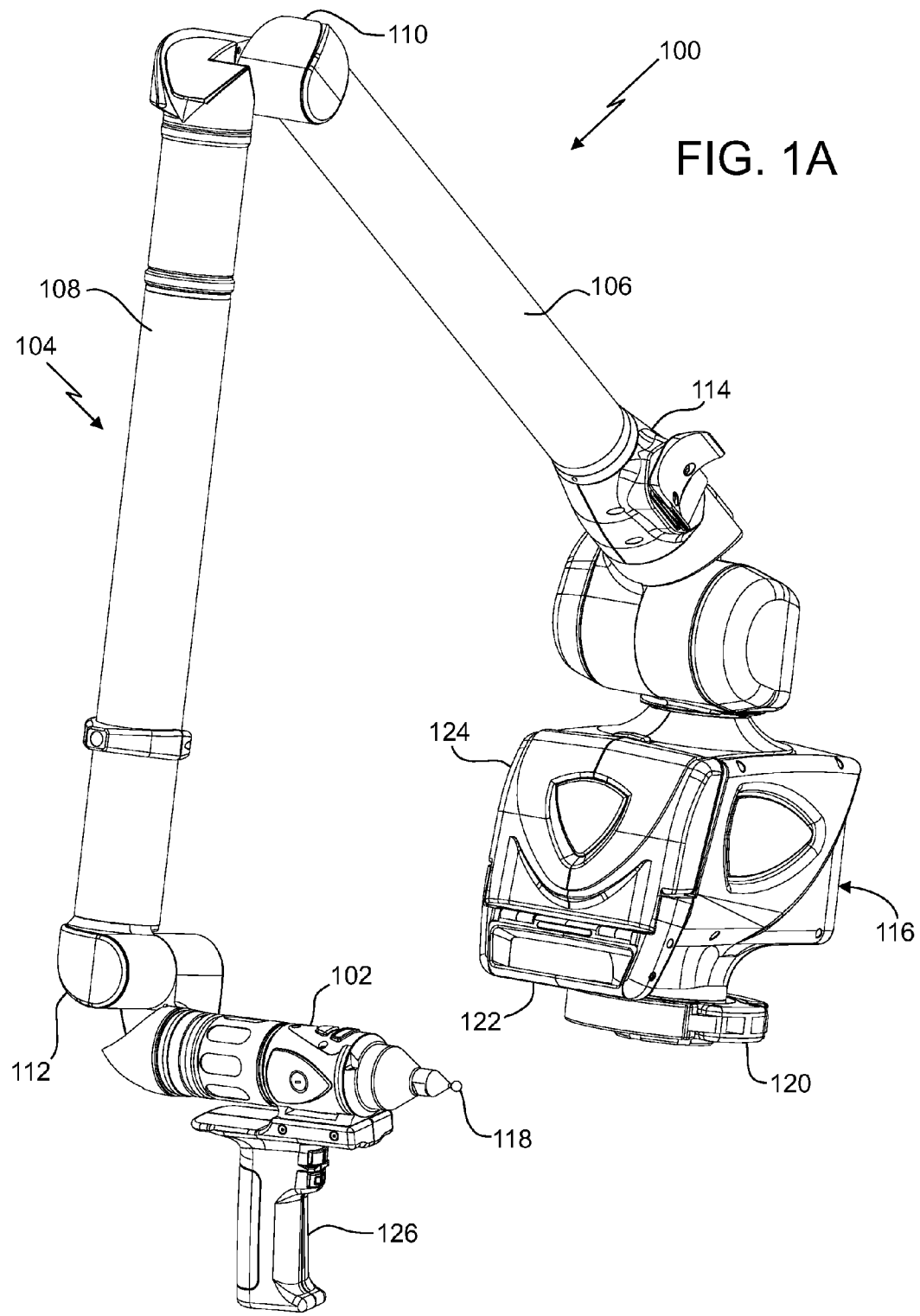
FIGS. 1A and 1B, are perspective views of a portable articulated arm coordinate measuring machine (AACMM) having embodiments of various aspects of the present invention therewithin.
Figure 1B:
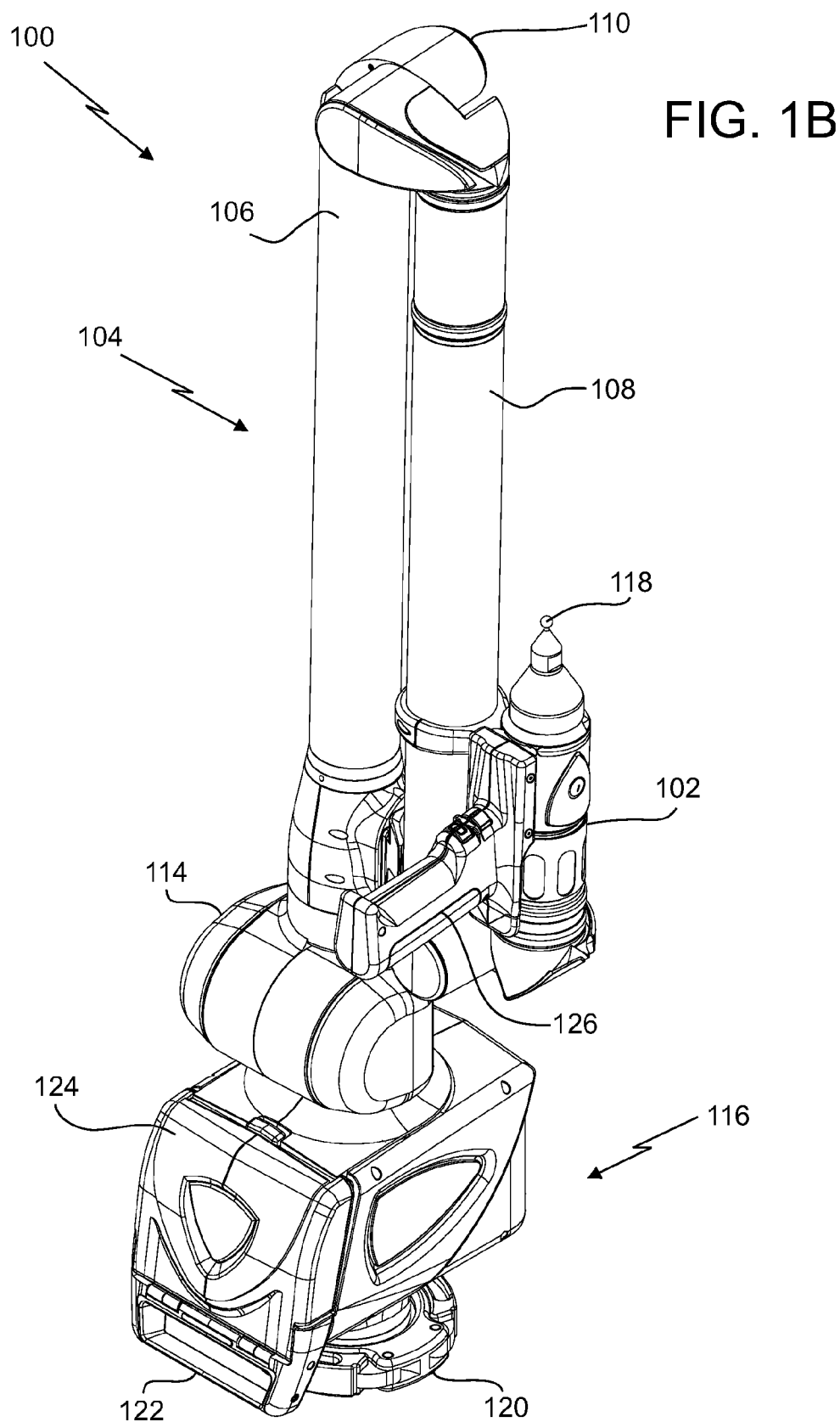

FIGS. 1A and 1B illustrate, in perspective, a portable articulated arm coordinate measuring machine (AACMM) 100 according to various embodiments of the present invention, an articulated arm being one type of coordinate measuring machine. As shown in FIGS. 1A and 1B, the exemplary AACMM 100 may comprise a six or seven axis articulated measurement device having a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the measurement probe housing 102 may comprise the shaft of the seventh axis portion of the AACMM 100 (e.g., a cartridge containing an encoder system that determines movement of the measurement device, for example a probe 118, in the seventh axis of the AACMM 100). In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. The handle 126 may be replaced with another device (e.g., a laser line probe, a bar code reader), thereby providing advantages in allowing the operator to use different measurement devices with the same AACMM 100. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 126 is replaced with the LLP using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2, the removable handle 126 may also include an electrical connector that allows electrical power and data to be exchanged with the handle 126 and the corresponding electronics located in the probe end.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a LLP that can be mounted to the removable handle 126 on the AACMM 100). The electronics that support these peripheral hardware devices or features may be located in each of the bearing cartridge groupings 110, 112, 114 located within the portable AACMM 100.

Figure 2A:
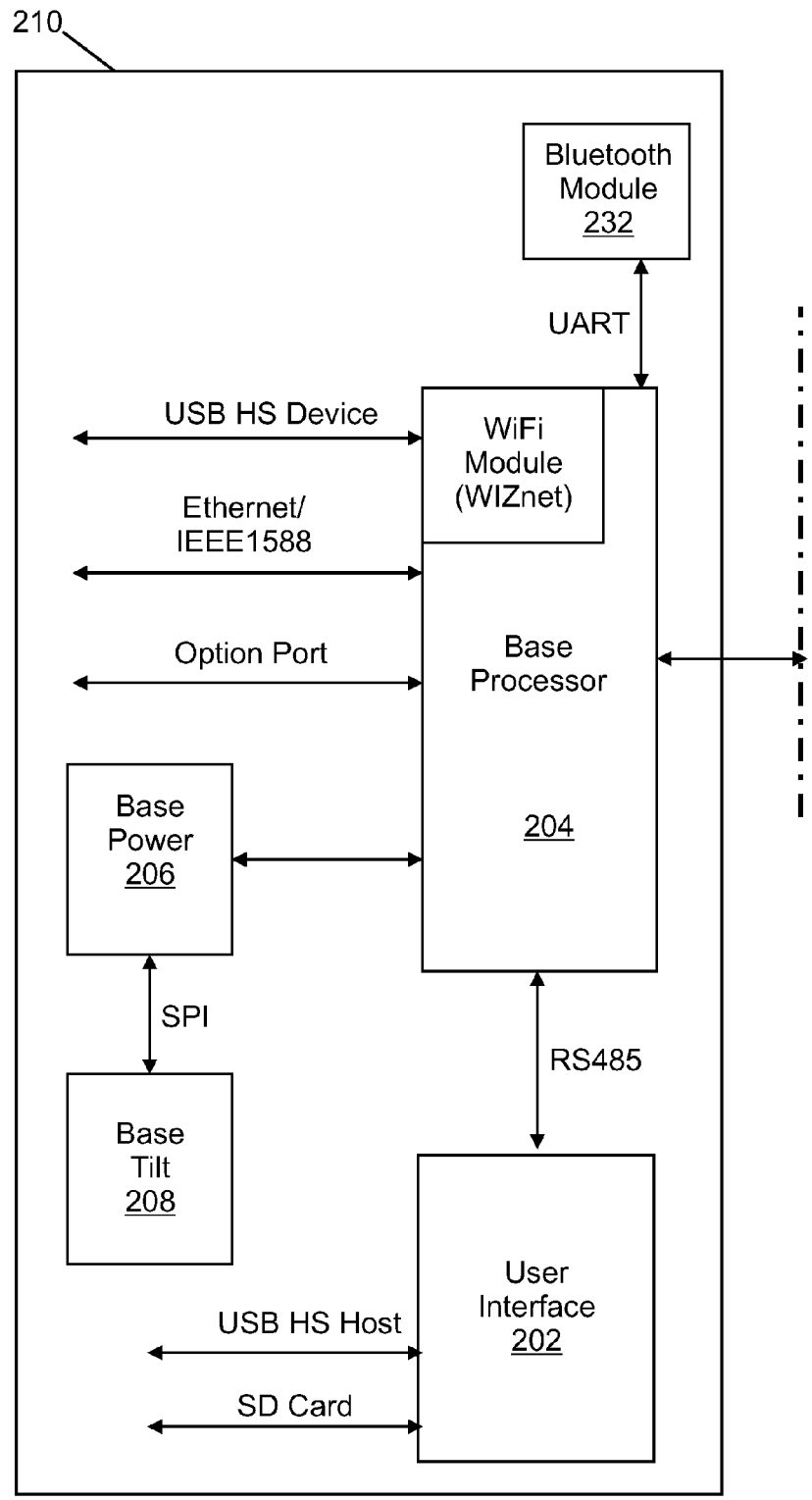
FIG. 2, including FIGS. 2A-2D taken together, is a block diagram of electronics utilized as part of the AACMM of FIG. 1 in accordance with an embodiment.
Figure 2B:
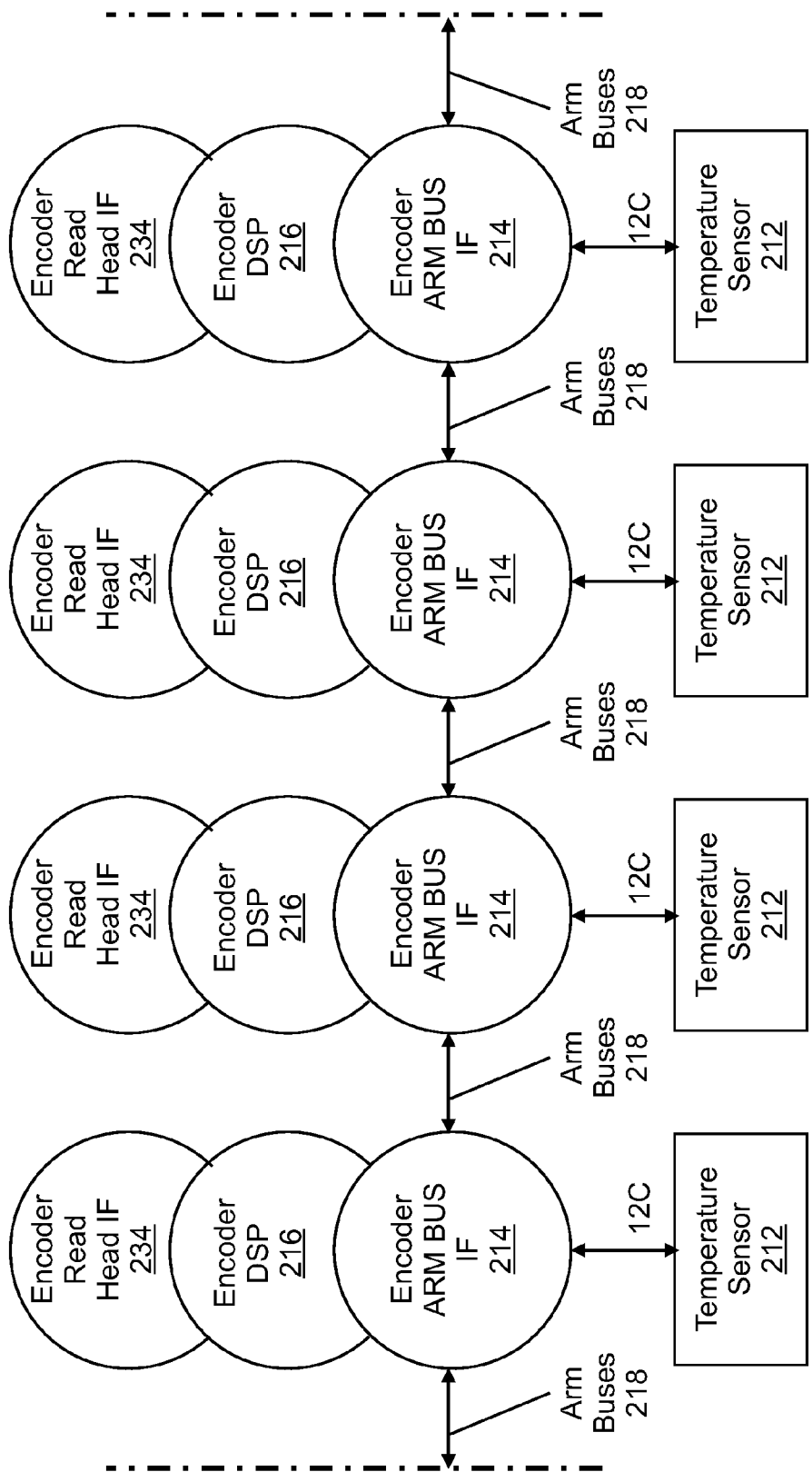
Figure 2C:
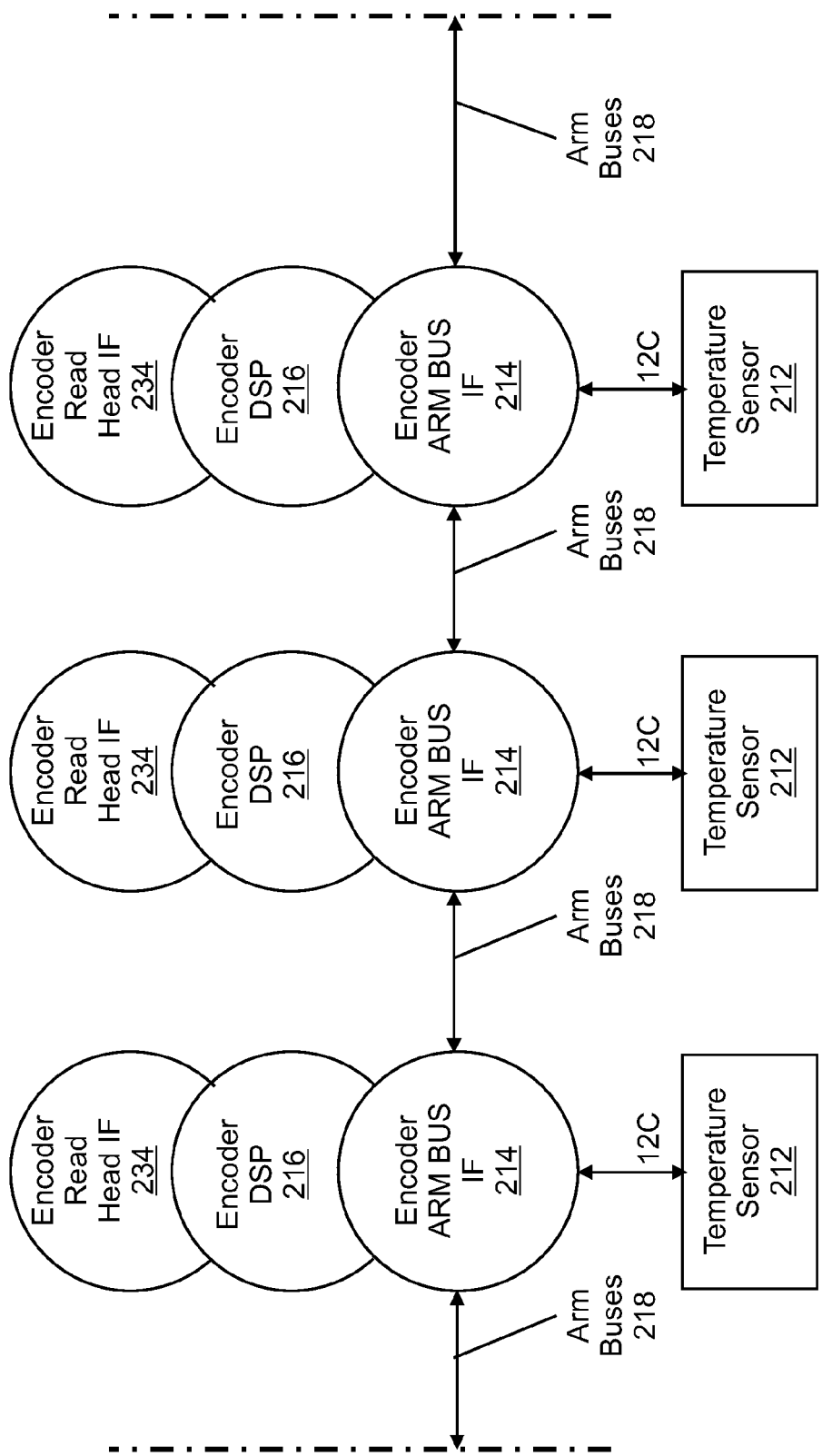
Figure 2D:
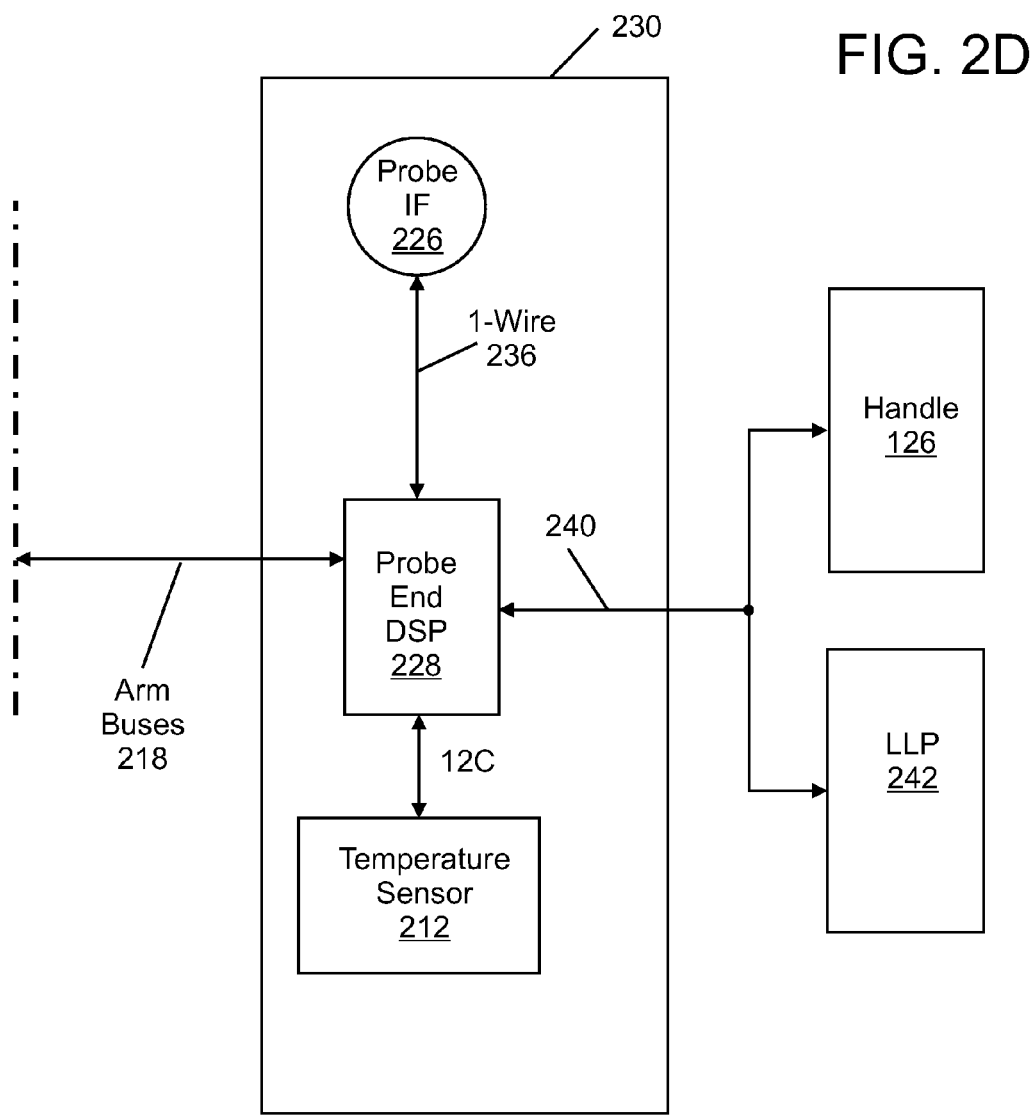
Figure 2:
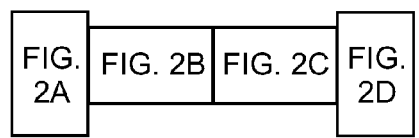

FIG. 2 is a block diagram of electronics utilized in an AACMM 100 in accordance with an embodiment. The embodiment shown in FIG. 2 includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

As shown in FIG. 2, the electronic data processing system 210 is in communication with the aforementioned plurality of encoder systems via one or more arm buses 218. In the embodiment depicted in FIG. 2, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Also shown in FIG. 2 are probe end electronics 230 that are in communication with the arm bus 218. The probe end electronics 230 include a probe end DSP 228, a temperature sensor 212, a handle/LLP interface bus 240 that connects with the handle 126 or the LLP 242 via the quick-connect interface in an embodiment, and a probe interface 226. The quick-connect interface allows access by the handle 126 to the data bus, control lines, and power bus used by the LLP 242 and other accessories. In an embodiment, the probe end electronics 230 are located in the measurement probe housing 102 on the AACMM 100. In an embodiment, the handle 126 may be removed from the quick-connect interface and measurement may be performed by the laser line probe (LLP) 242 communicating with the probe end electronics 230 of the AACMM 100 via the handle/LLP interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-wire® communications protocol 236.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as an LLP 242. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Turning now to the user interface board 202 in FIG. 3, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3 also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 356. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

Figure 4:
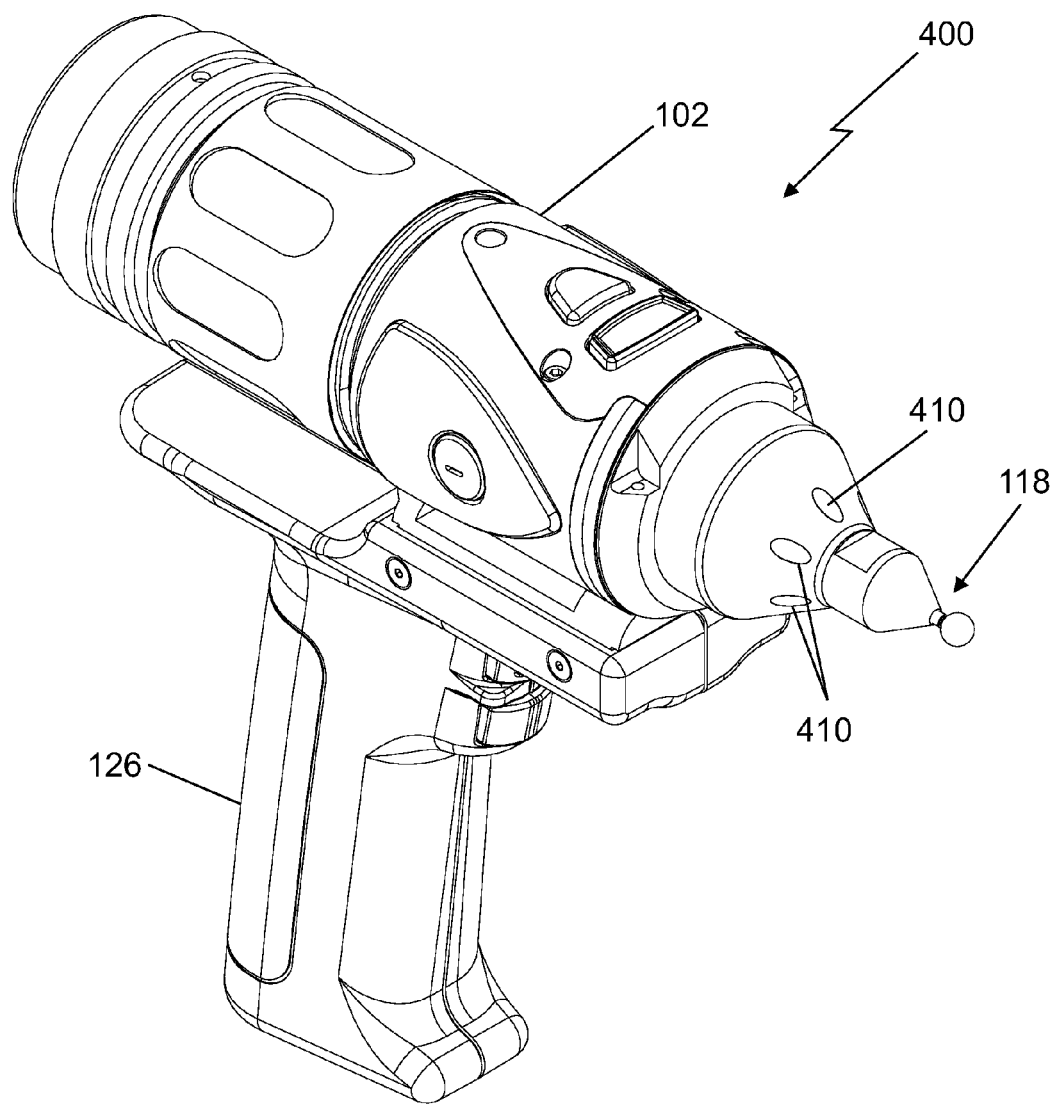
FIG. 4 is a more detailed perspective view of the probe end section of the AACMM of FIG. 1 having the handle and an illuminated probe attached thereto.

Referring to FIG. 4, there illustrated in more detail is the probe end section 400 having the handle 126 connected thereto using, for example, a mechanical and electronic interface. The probe end section 400 may include various components, such as for example and without limitation, an internal shaft, a housing, bearings, electronics that may perform signal processing and/or other functions, light rings and a lock nut. The contacting or non-contacting measurement device 118 is mounted to the measurement probe housing 102. As described in more detail hereinafter, the measurement probe housing 102, the measurement device 118, and/or the handle 126 may also include mechanical, electronic and/or optical components that are integrated into the probe end housing 102, the measurement device 118, and/or the handle 126 and are part of the illumination lights or other similar illumination features of embodiments of the present invention.

Figure 5:
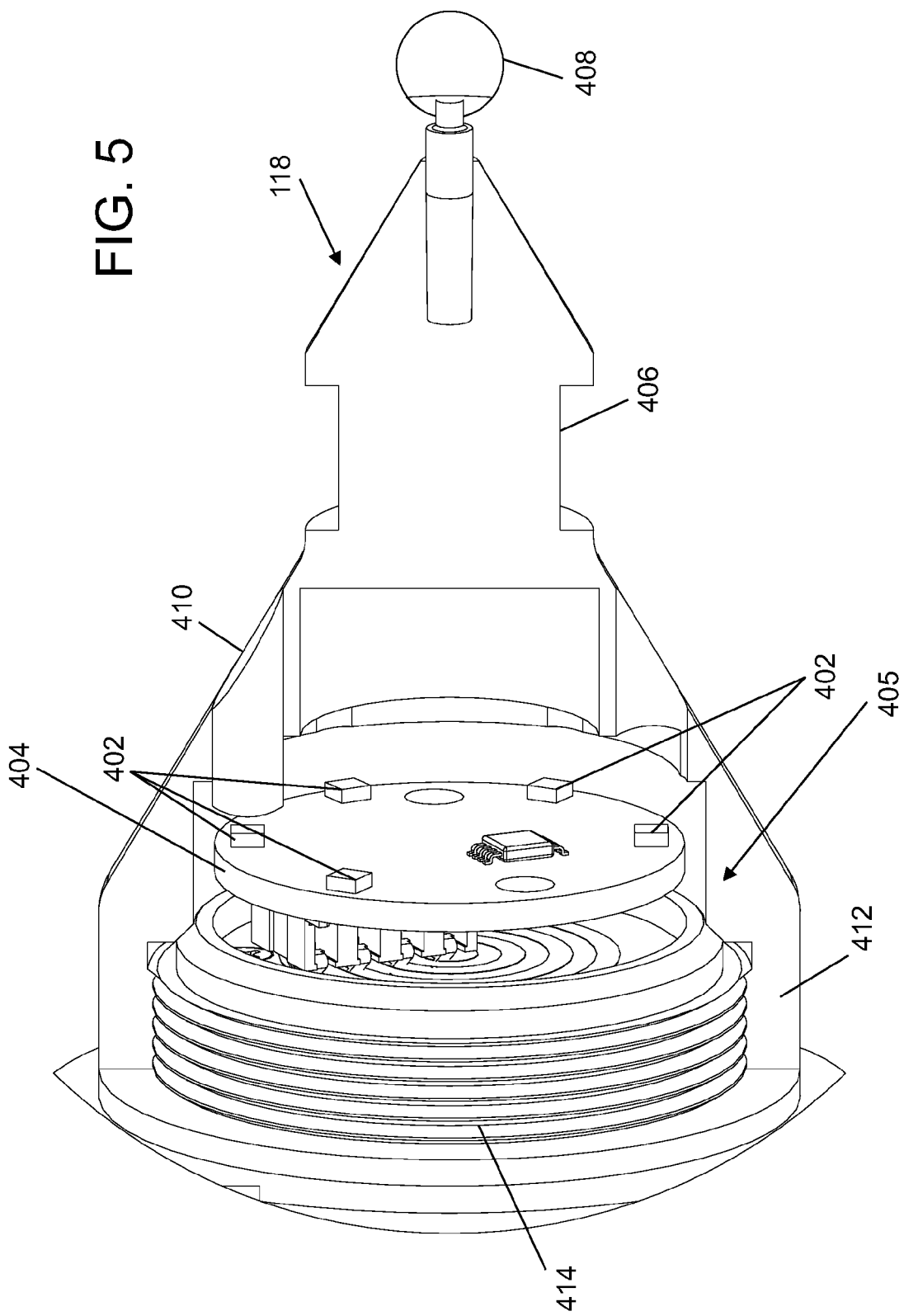
FIG. 5 is a cross sectional, cutaway view of the measurement device shown in FIG. 4 having integrated targeted area illumination features according to an embodiment of the present invention.

Referring to FIGS. 4-5, there illustrated is an embodiment of the present invention in which the measurement device 118 and the area adjacent the measurement device 118 are illuminated with one or more light sources such as, for example, light emitting diodes (LEDs) 402. In this embodiment of an illuminated measurement device or "i-Probe," a measurement device 118 includes an electronic interface circuit board 404 located at an interface 405 between the probe end section 401 and the measurement device 118. In one embodiment, the electronic interface circuit board 404 is disposed within a body 406 of the measurement device 118 and which contains the one or more light sources, such as LEDs 402. Examples of such embodiments include, without limitation, the LEDs 402 being mounted on the electronics interface board 404, where the board 404 is installed within the body 406 and is electronically connected to the probe end housing 102. The body 406 may include a threaded portion 412 that cooperates with a threaded member 414 on the end of the measurement probe housing 102 to couple the measurement device 118 to the measurement probe housing 102.

The LEDs 402 may be aligned to face the tip end 408 and provide illumination through the body 406 to a targeted area such as, for example, a portion of a part being measured by the AACMM 100. More specifically, one or more holes or lenses 410 in the cone shaped portion of the body 406 may allow light from the LEDs 402 to exit the measurement device 118 and may focus this light at the targeted area, thereby illuminating the work surface of the part near the tip end 408. In the exemplary embodiment, five LEDs 402 are disposed on the electronics interface board 404 and are aligned to direct light through a corresponding opening or lens 410. In another embodiment, a plurality of LEDs 402 are disposed equally about the electronics interface board 404 (e.g. four LEDs arranged 90 degrees apart). It should be appreciated that the location of the light source at the interface of the probe end section and measurement device or in the measurement device provides advantages in projecting light onto the work surface without interference from the operator's hand.

Figure 6:
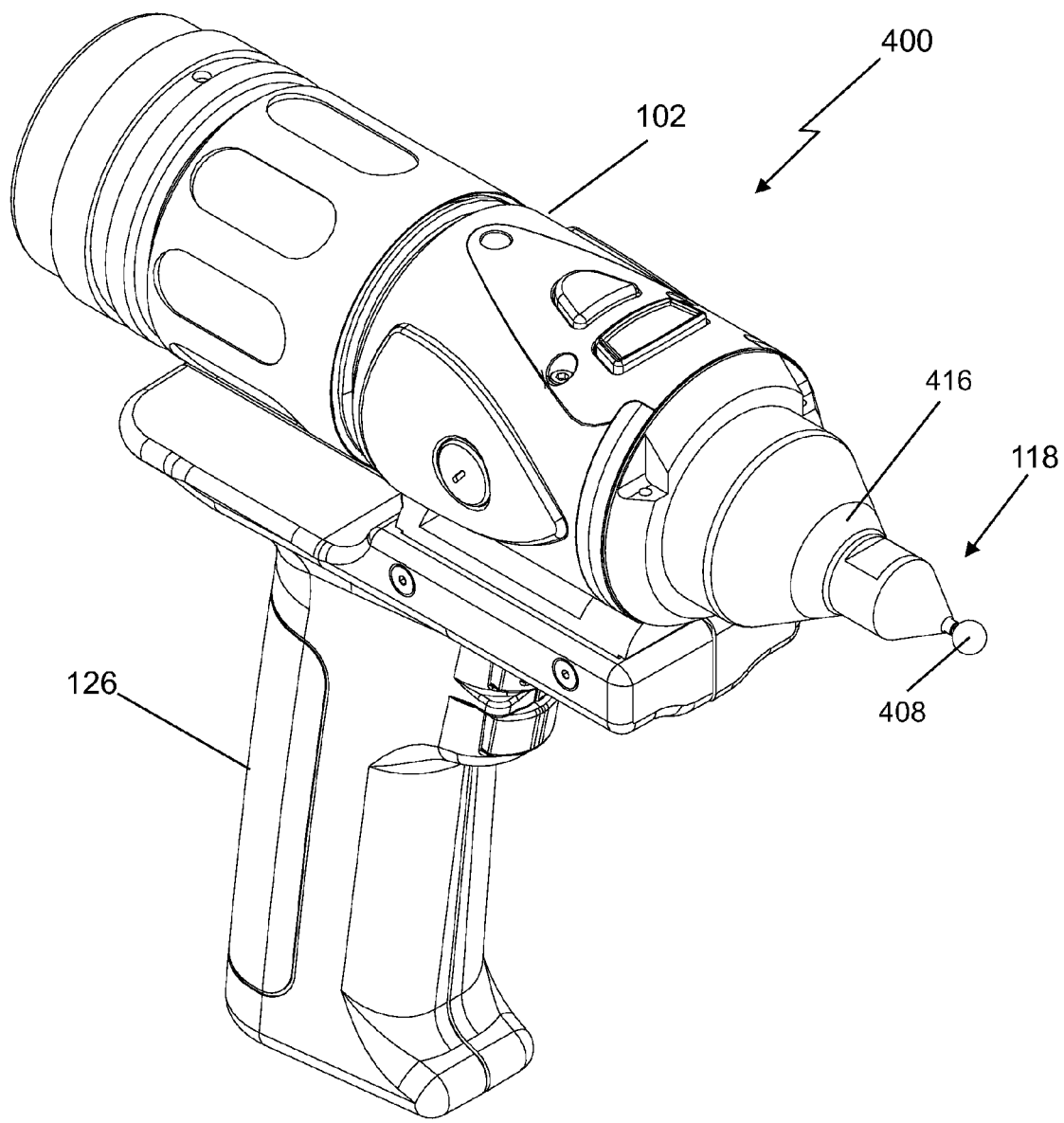
FIG. 6 is a perspective view of a light pipe originating from one or more light sources within the probe housing and being configured as a light ring to thereby provide 360 degrees of illumination around the probe housing near the measurement device.

Referring to FIG. 6, there illustrated is an embodiment of the present invention in which a light pipe originating from one or more light sources (e.g., LEDs 402) within the body 406 is configured as a light ring 416. In one embodiment, the light ring 416 provides 360 degrees of illumination around the body 406 near the tip end 408. In another embodiment, the light ring 416 extends less than 360 degrees (e.g. 180 degrees). In yet another embodiment, a light ring 416 is provided that extends less than 360 degrees and is arranged to allow the operator to rotate the light ring 416 about the body 406.

Figure 7:
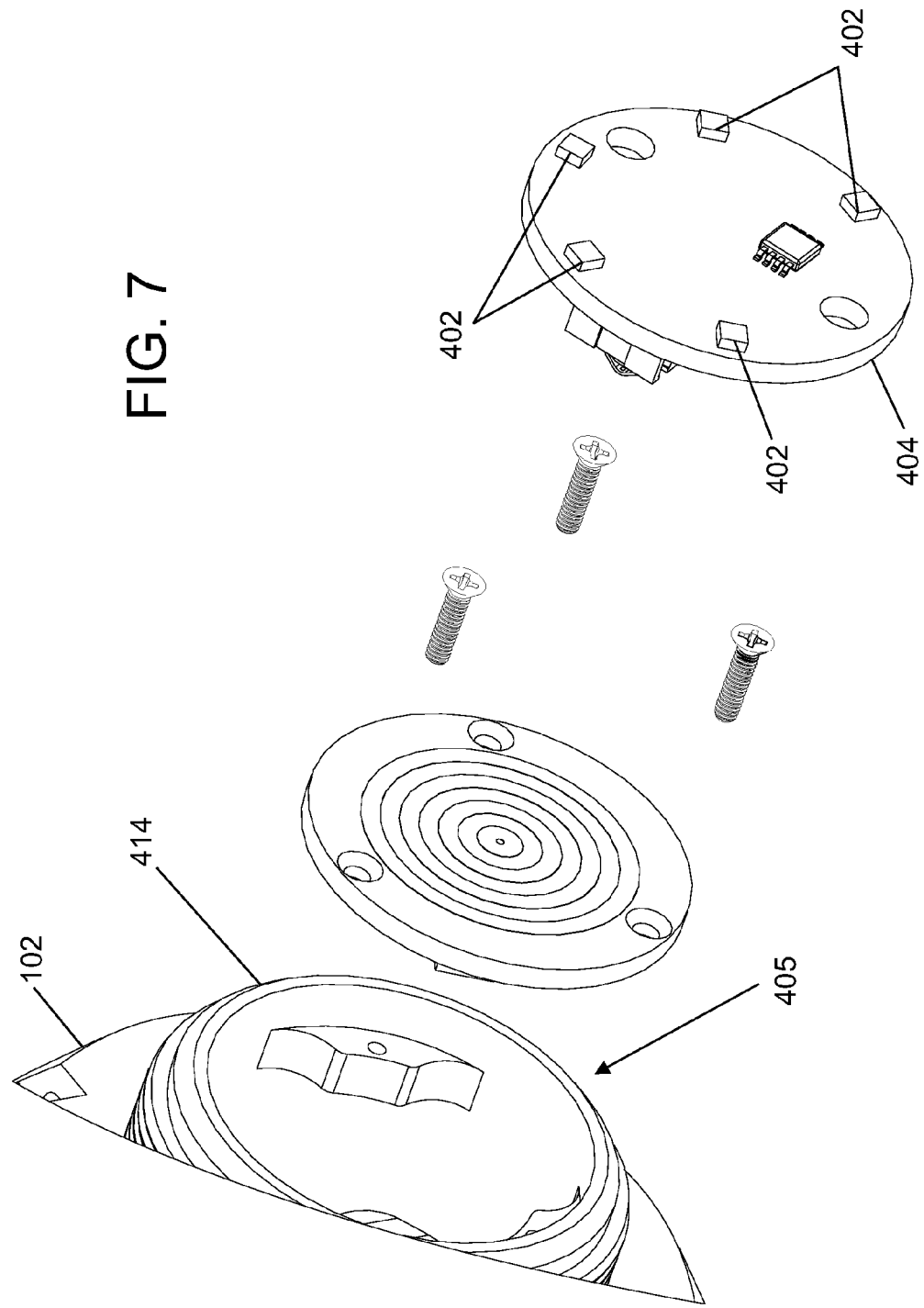
FIG. 7 is an exploded view of another embodiment of the present invention in which the LEDs and the electronics boards are installed with the probe end at the end of the AACMM of FIG. 1.
Figure 8:
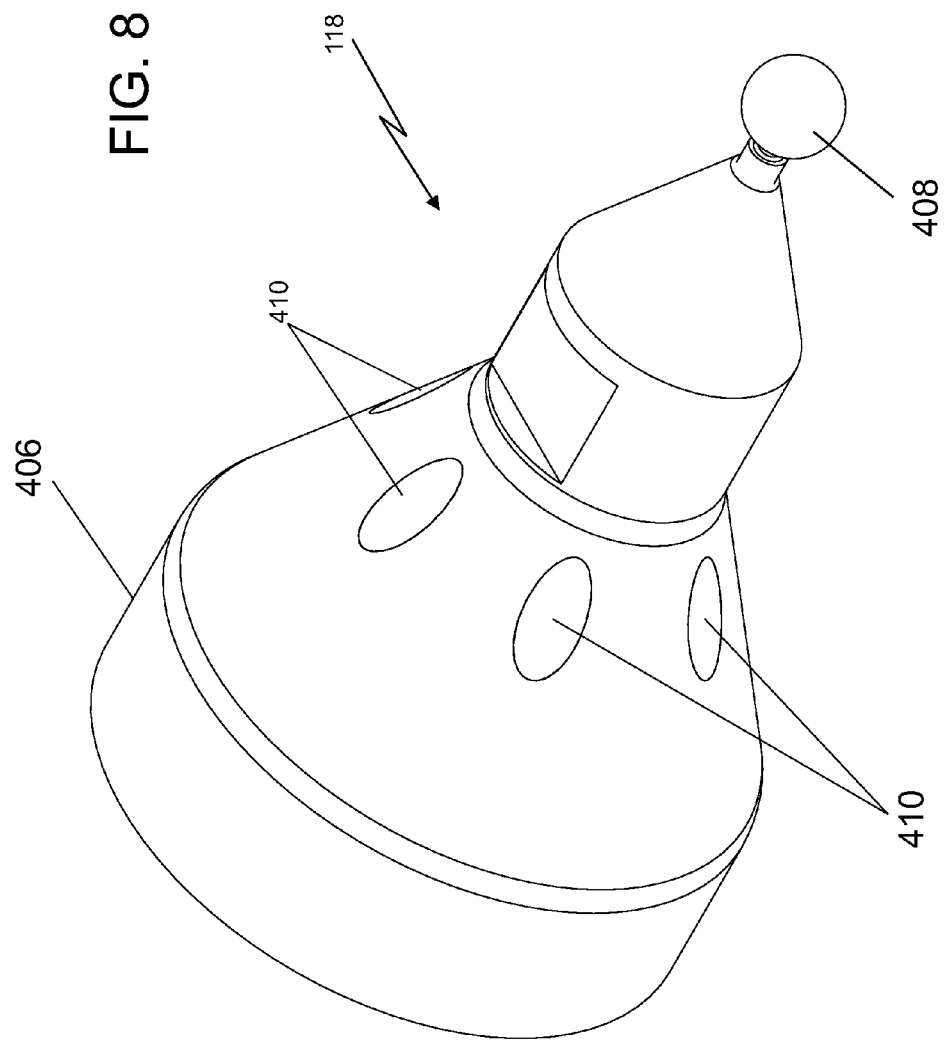
FIG. 8 is a perspective view of the probe housing of the embodiment of FIG. 7 in which the probe housing has holes, light pipes or lenses through which the light from the LEDs on the probe end travels through lenses on the probe housing to a targeted area.

Referring to FIG. 7, there illustrated is an embodiment of the present invention in which the LEDs 402 and the one or more electronics circuit boards 404 are installed within the measurement probe housing 102 at the end of the AACMM 100, instead of in the body 406, as in the embodiment of FIG. 5. Referring also to FIG. 8, in this embodiment the light source(s) 402 direct their light to a targeted area through holes, light pipes or lenses 410 located in a body 406 that may contain none of the electronics circuit boards 404 and also may not provide accommodation for any electrical connections.

It should be appreciated that while embodiments herein may refer to the light source as being LEDs 402, this is for exemplary purposes and the claimed invention should not be so limited. The light source used to illuminate the work area may include but is not limited to: an incandescent lamp; a organic light emitting diode (OLED); a polymer light emitting diode; a gas discharge lamp; fluorescent lamp; a halogen lamp; a high-intensity discharge lamp; or a metal halide lamp for example.

Figure 9:
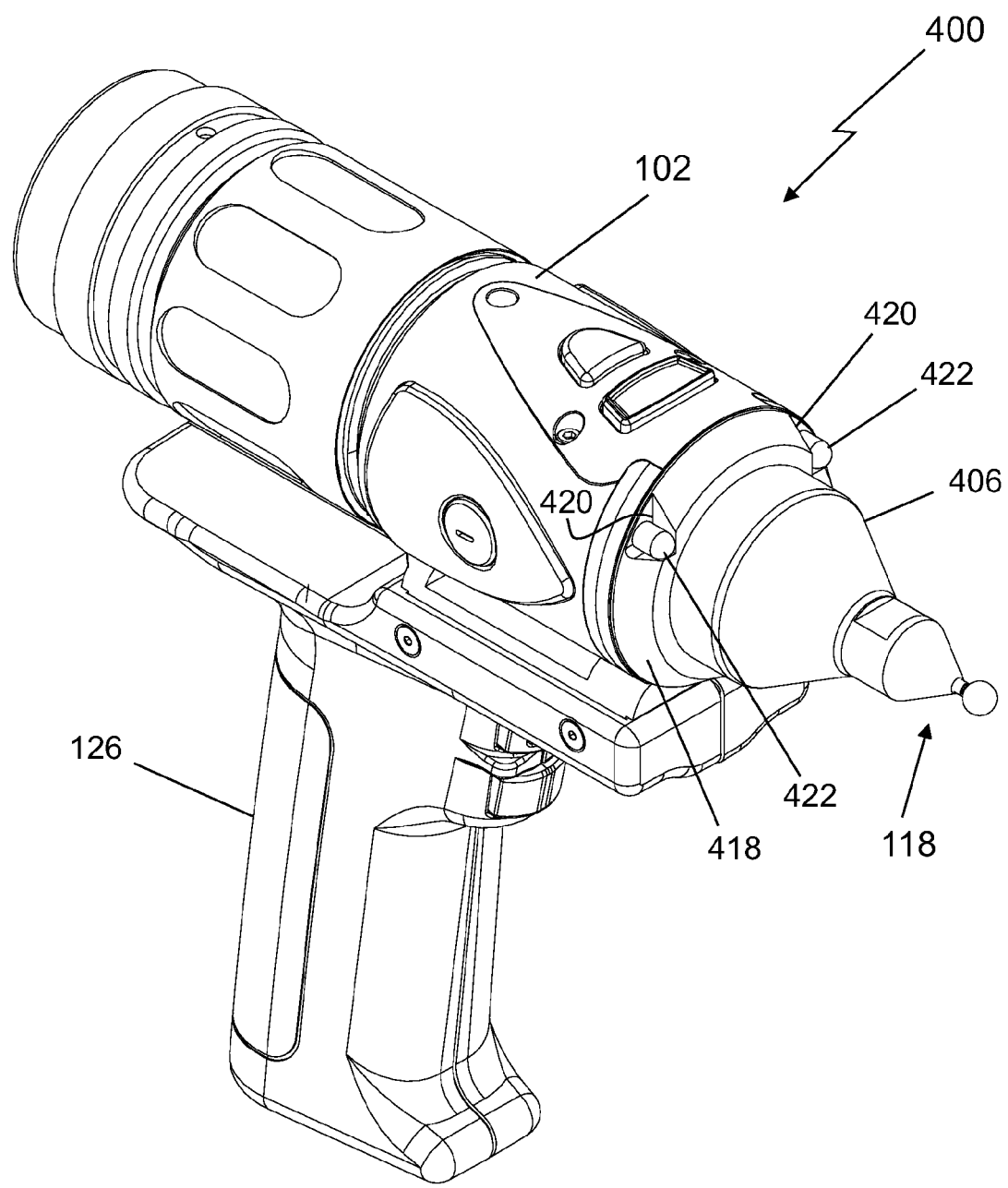
FIG. 9 is a perspective view of another embodiment of the present invention in which the probe end of the AACMM is illuminated by one or more light sources located on an electronics circuit board positioned inside the probe end of the AACMM.

Referring to FIG. 9, there illustrated is another embodiment of the present invention in which the probe end section 400 of the AACMM 100 of FIG. 1 (to which the measurement device 118 is mounted) is illuminated by, for example, one or more light sources, such as LEDs 402 for example. In another embodiment, the LEDs 402 may be located on an electronic interface circuit board 404 that is located inside the measurement probe housing 102 of the AACMM 100. Holes, lenses or light pipes 410 located in the measurement probe housing 102 may be used to direct light forward toward the tip end 408, as well as around the tip end 408. Alternatively or in addition, a light pipe or light ring located on the circumference of the measurement device 118 can be used to provide general area illumination, similar to the embodiment of FIG. 6. In the embodiment of FIG. 9, the body 406 may have a conical surface 418 adjacent the threaded portion 412. The conical surface 418 includes at least one recess 420. Extending from the recess 420 is a lens 422 that cooperates with a feature similar to holes, lenses or light pipes 410 to emit light generated by the LEDs 402. In one embodiment, the LEDs 402 are disposed within the lens 422.

Figure 10:
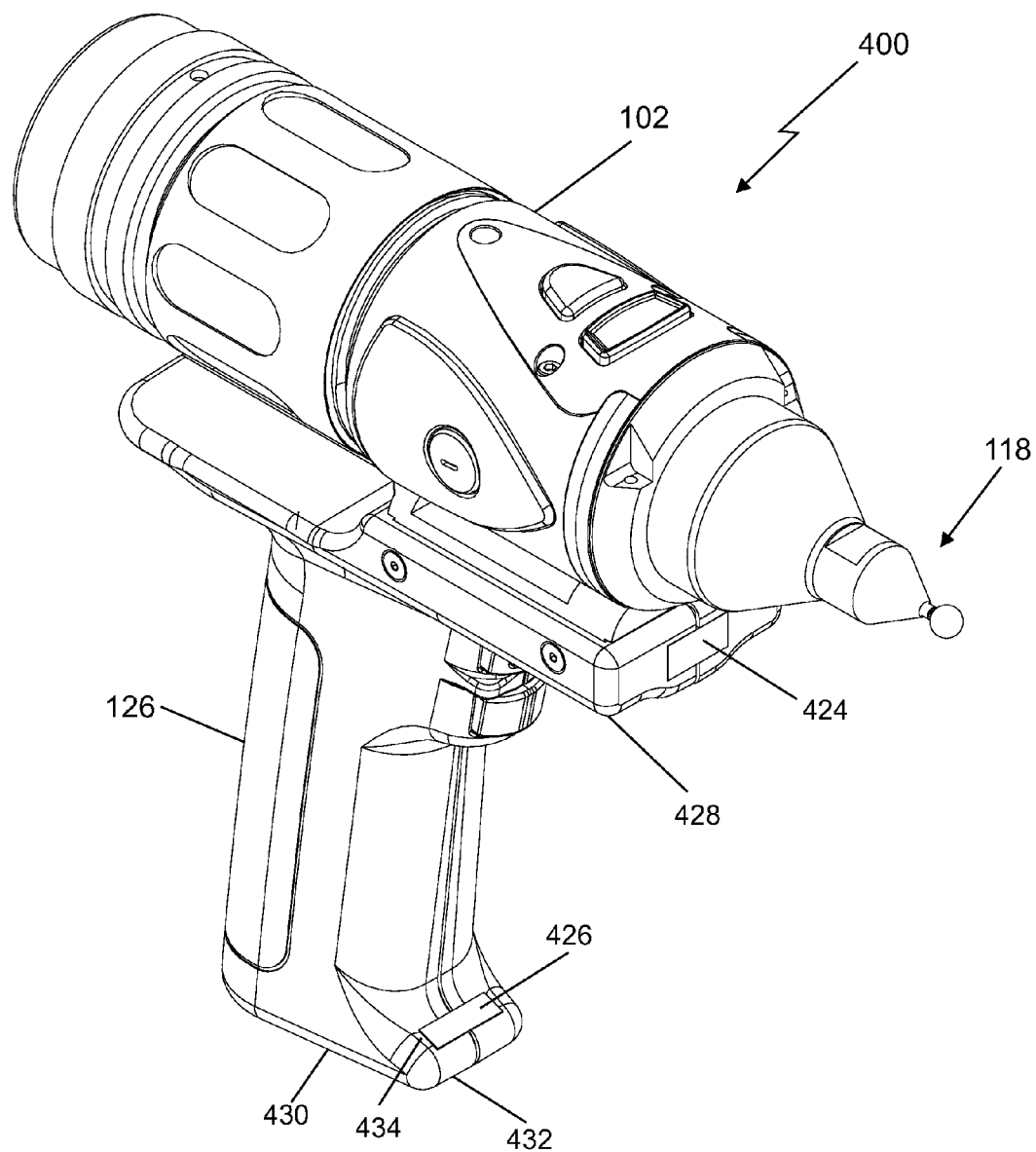
FIG. 10 is a perspective view of a handle attached to the probe end of the AACMM of FIG. 1, wherein the handle includes one or more integrated light sources, according to another embodiment of the invention.

In still other embodiments of the present invention, accessories that attach to the probe end section 400 of the AACMM of FIG. 10 may be utilized primarily for illumination, or include illumination as a secondary benefit. For example, FIG. 10 illustrates a handle 126 attached to the measurement probe housing 102 of the AACMM 100. In this embodiment the handle 126 includes one or more integrated light sources 424, 426. The first light source 424 is disposed on a projection 428 on handle 126 adjacent the measurement device 118. The first light source 424 may include a lens member that focuses or diffuses the light being emitted from the first light source 424. The lens member may be configured to allow the operator to manually adjust the focus and diffusion of the light.

The handle 126 may include a second light source 426 disposed on an end 430 opposite the measurement probe housing 102. The end 430 may include a projection 432 having an angled surface 434. The second light source 426 may be disposed on the angled surface 434 to emit light on an angle towards the measurement device 118 and the surrounding area. It should be appreciated that the second light source 426 may provide advantages in distributing light on work surface to provide improved visibility in applications where a light source disposed near the measurement device 118 may be blocked from the desired viewing area. In one embodiment, the second light source 426 includes a lens. The lens may be manually adjustable to allow the operator change the location and amount of light directed towards the measurement device 118.

Figure 11:
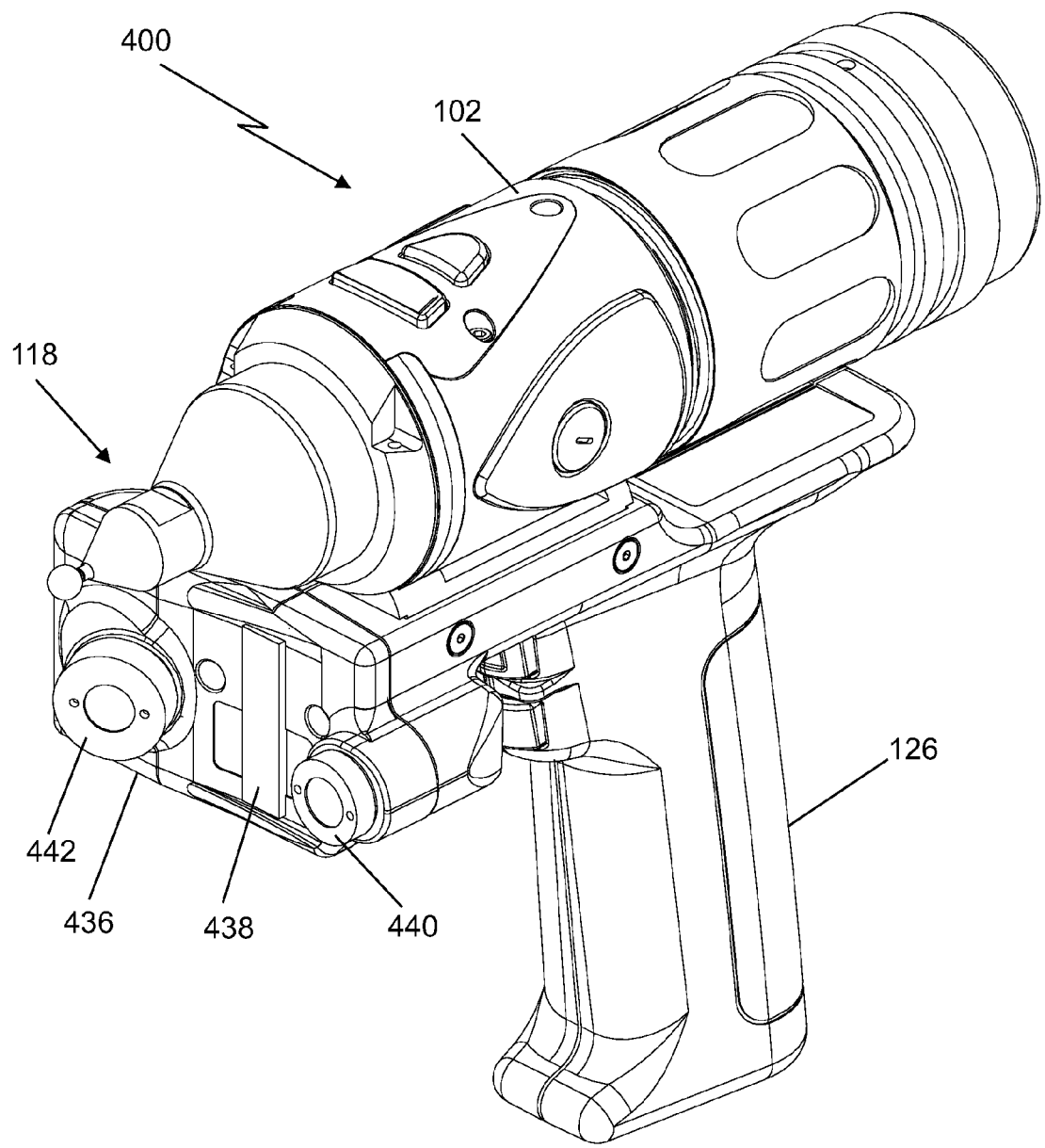
FIG. 11 is a perspective view of a laser line probe (LLP) mounted to the AACMM of FIG. 1 with an integrated light source located on the front of the LLP, according to another embodiment of the invention.

Referring to FIG. 11, there illustrated is a handle 126 having a laser line probe (LLP) 436 with a light source 438. An LLP 436 is an accessory for an AACMM 100 having an optical device 440, such as a laser for example, arranged adjacent a sensor 442, such as a camera for example. The LLP 436 allows for the acquisition of three-dimensional coordinate data without contacting the object. The LLP 436 may have a focal point or focal line where the coordinate data is optimally acquired. In this embodiment, the LLP 436 includes an integrated light source 438 disposed between the optical device 440 and the sensor 442. The light source 438 emits light in the area adjacent the measurement device 118 and the LLP 436, such as in the area of an optimal focal point/line. It should be appreciated that the probe end section 400 having an LLP 436 may also include additional light sources, such as LEDs 402 disposed in the measurement device 118 or measurement probe housing 102 that cooperate to provide a desired illumination of the work surface or object being measured.

Unlike the light emitted by the optical device 440, the light emitted by light source 438 is provided in such a way as to minimize the response from sensor 442. In an embodiment, this insensitivity is achieved by powering the light source 438 only when the LLP is not collecting data. In another embodiment, the insensitivity is achieved by minimizing the effect of the wavelength of light from light source 438 on the sensor 442, either by selecting a wavelength for light source 438 that substantially reduces or minimizes the response from the sensor 442 or by adding an optical filter over the sensor 442 to block the wavelengths from the light source 438.

In commercially available laser line probes, the light emitted by the optical device 440 is laser light, which is a type of light that has high coherence. The light source 438, on the other hand, which is intended for general illumination, has low coherence. In the future, light emitted from the optical device 440 may come from a super luminescent diode (SLD), which is another type of low coherence device.

Accessories other than an LLP 436 that may be mounted to the probe end section 400 of the AACMM 100 may each include one or more light sources of illumination in accordance with the teachings herein in exemplary embodiments of the present invention. These various accessories may include, for example and without limitation: (1) a camera with an integrated light source, which may include flash capability for photography; (2) a thermal imagery device with an integrated light source; (3) a bar code reader with an integrated light source; (4) a non-contact temperature sensor with an integrated light source; (5) a projector with or used as a light source; and (6) a stand-alone light source, for example, as a mountable accessory.

Figure 12:
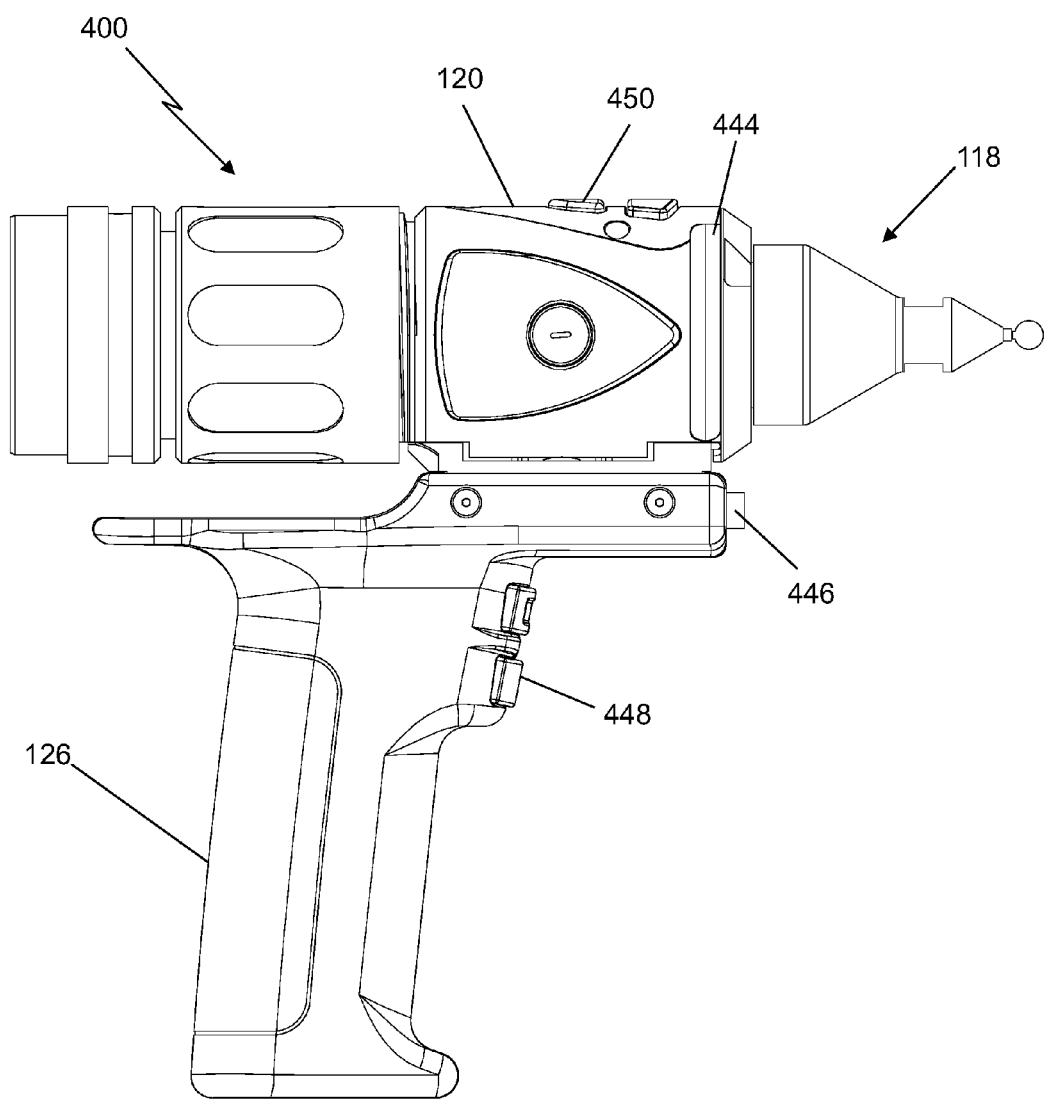
FIG. 12 is a side view of a probe end of the AACMM of FIG. 1 in which the probe end has a light ring capable of displaying different colors.

In other embodiments of the present invention, dual function lighting allows for the possibility to have multi-purpose light sources. Such dual function lighting arises, for example, from the advent of multi-color (e.g., RGB) LED components that can be controlled to produce any color or a continuous spectrum of light (as interpreted by the human eye). Generally, we refer to light sources that can produce more than one color of light as variable-spectrum light sources. For example, a variable-spectrum light source may contain red, blue, and green lights that can be illuminated one at a time or combined to produce nearly any color in the visible spectrum, as perceived by the human eye. Referring to FIG. 12, LEDs or other light sources or indicators, such as a light ring 444 for example may be used to indicate status of the AACMM 100. For example, a blue light (450-475 nanometers) may be emitted for "Power On", red (620-750 nanometers) for "Stop", amber for "Warning", or green (495-570 nanometers) for "Good", etc., all of which may be commanded or changed to a white light for general illumination purposes. In FIG. 12, these status lights may be in the form of a single 360-degree light ring 444 located on the measurement probe housing 102 or handle 126 of the AACMM 100 of FIG. 1. Also, the light ring 444 may be used to provide general illumination, instead of a status indicator, when commanded to produce white light.

Referring again to FIGS. 4-5, LEDs 402 located on the measurement device 118 (or the probe end portion 400) and intended for general illumination can also be commanded to change their color of illumination to indicate a status of the AACMM 100. In this way, the status light color can be projected onto the part surface targeted area, thereby providing feedback to the operator without having to look at an indicator light on the AACMM 100. For example, the color of lights used for general illumination may be changed for a specific application. As examples, blue light, instead of white light, may be used with an LLP 436 to provide surface illumination without the possibility of interfering with the wavelength (e.g., red) of the light source in the LLP. In addition, red light might be used in low light situations, or situations where it is desirable to minimize glare and reduce the range over which the light is seen. When illuminating colored surfaces, a light color can be chosen to maximize contrast. When used in conjunction with other devices that might project grids, targets or other visual cues onto the part surface, a color can be chosen that does not visually obliterate that image or interfere with the operation of the device producing and utilizing the image.

In one embodiment, the light source such as light ring 444 includes a continuous spectrum light source, such as an RGB LED 402 for example, that is operably coupled with a sensor 446. The sensor 446 may be a range finder or a pyrometer for example. The sensor 446 measures a desired parameter and provides a signal to a controller (not shown) disposed within the measurement probe housing 102. The controller changes the color, or a shade of the color emitted by the light ring 444 in response to the measured parameter either passing a threshold (e.g., a temperature threshold or a distance threshold) or being within a desired range. Where the sensor 446 is a range finder, the shade of the emitted color may be changed as the probe end portion 400 moves closer to the object. This provides advantages in allowing the operator to receive a visual indication as to the distance to the object, even if the tip end 408 of measurement device 118 is not visible to the operator (e.g. within a cavity). In an embodiment with an LLP 436, the color or shade may change when the object is within a desired range of the LLP focal point/line. In one embodiment, the light ring 444 may change to a shade or a different color when the measurement probe is in a desired location for obtaining a particular measurement, such as the diameter of a cylindrical hole half way between the bottom and the surface of the hole for example.

In other embodiments, the sensor 446 may be a temperature measurement device such as a pyrometer for example. In this embodiment, the color or shade of the light ring 444 may be changed in response to the temperature of the object or the surrounding environment. This arrangement provides advantages by giving the operator with a visual feedback on whether it is desirable to position the probe end portion 400 in the area where the measurement is to be taken. If the temperature is too high, the acquired measurement may be erroneous (due to thermal expansion) or the measurement device may be damaged due to the high temperatures.

The light sources described herein may be activated by the operator such as through the actuation of button 448 on the handle 126 or button 450 on the probe housing 102. The light sources may further be activated by a command issued from the electronic data processing system 210, the user interface board 202 or via a remote computer. This provides advantages in allowing the light source to be turned on by a second operator in the event the operator manipulating the probe end portion 400 is in a confined space or is otherwise unable to depress one of the buttons 448, 450.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of conveying information with a portable articulated arm coordinate measuring machine (AACMM), with steps comprising:
providing a manually positionable articulated arm portion having opposed first and second ends, the arm portion including a plurality of connected arm segments, each of the arm segments including at least one position transducer for producing a position signal;
providing a measurement device coupled to the first end;
providing an electronic circuit for receiving the position signals from the transducers and for determining a position of the measurement device;
providing a first light source coupled to the first end, the first light source configured to emit first light, the first light being visible light;
moving by an operator the measurement device to a first position adjacent to a first object;

measuring the first position;

determining a first color based at least in part on the first position and a distance between the measurement device and the first object; and illuminating the first light source to emit the first light, the first light having the first color.

2. The method of claim 1 wherein, in the step of providing a measurement device, the measurement device is a laser line probe.

3. The method of claim 2 wherein, in the step of determining the first color, the first color is further determined according to whether the laser line probe is at a predetermined distance from the first object.

4. The method of claim 1, wherein the step of determining the first color is further based on a digital model of a first feature of the first object.

5. The method of claim 4 wherein, in the step of determining the first color, the first feature is based at least in part on a computer aided design model.

6. The method of claim 4 wherein, in the step of determining the first color, the first feature is based at least in part on measurements made by the portable articulated arm CMM.

7. The method of claim 4 wherein, in the step of determining the first color, the first feature has a cylindrical shape.

8. The method of claim 7 wherein, in the step of providing the measurement device, the measurement device is a contacting probe.

9. The method of claim 1 wherein:
in the step of providing a first light source, the first light source provides a plurality of wavelengths; and
in the step of determining the first color, the first color is based at least in part on the plurality of wavelengths.

10. The method of claim 9 wherein, in the step of providing a first light source, the first light source is a multi-color LED light source.

11. The method of claim 1 wherein, in the step of providing a first light source, the first light source is configured to illuminate a portion of a ring.

12. A method of conveying information with a portable articulated arm coordinate measuring machine (AACMM), with steps comprising:
providing a manually positionable articulated arm portion having opposed first and second ends, the arm portion including a plurality of connected arm segments, each of the arm segments including at least one position transducer for producing a position signal;
providing a measurement device coupled to the first end;
providing an electronic circuit for receiving the position signals from the transducers and for determining a position of the measurement device;
providing a first light source coupled to the first end and configured to project onto a first object a first light, the first light being visible light;
moving the measurement device to a first position by an operator, the first object being adjacent the first position;
measuring the first position;
measuring a distance between the measurement device and to the first object;
determining a first color based at least in part on the first position and on the distance; and
projecting the first light onto the first object, the first light having the first color.

13. The method of claim 12 wherein, in the step of providing a measurement device, the measurement device is a laser line probe.

14. The method of claim 13 wherein, in the step of determining the first color, the first color is further determined according to whether the laser line probe is at a predetermined distance from the first object.

15. The method of claim 12, wherein the step of determining the first color is further based on a digital model of a first feature of the first object.

16. The method of claim 15 wherein, in the step of determining the first color, the first feature is based at least in part on a computer aided design model.

17. The method of claim 15 wherein, in the step of determining the first color, the first feature is based at least in part on measurements made by the portable articulated arm CMM.

18. The method of claim 15 wherein, in the step of determining the first color, the first feature has a cylindrical shape.

19. The method of claim 18 wherein, in the step of providing the measurement device, the measurement device is a contacting probe.

20. The method of claim 12 wherein:
in the step of providing a first light source, the first light source provides a plurality of wavelengths; and
in the step of determining the first color, the first color is based at least in part on the plurality of wavelengths.

21. The method of claim 20 wherein, in the step of providing a first light source, the first light source is a multi-color LED light source.

22. The method of claim 2 further comprising modulating the illumination of the light source, wherein the first light is emited when the laser line probe is not collecting data.

23. The method of claim 2 wherein the first light has an associated wavelength and the laser line probe includes an optical element that filters the wavelength.

24. The method of claim 1 further comprising changing the first color to a second color in response to a changing of the distance between the measurement device and the first object.

* * * * *